(12) United States Patent
Ishiguro et al.

(10) Patent No.: US 8,474,801 B2
(45) Date of Patent: Jul. 2, 2013

(54) SOLENOID DRIVING DEVICE AND ACTIVE VIBRATION ISOLATING SUPPORT DEVICE EQUIPPED WITH THE SAME

(75) Inventors: Tetsuya Ishiguro, Saitama (JP); Tatsuhiro Yone, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 539 days.

(21) Appl. No.: 12/732,565

(22) Filed: Mar. 26, 2010

(65) Prior Publication Data

US 2010/0246086 A1 Sep. 30, 2010

(30) Foreign Application Priority Data

Mar. 27, 2009 (JP) .................................. 2009-079415
May 21, 2009 (JP) .................................. 2009-122853

(51) Int. Cl.
*F16F 5/00* (2006.01)
(52) U.S. Cl.
USPC .................................. 267/140.14; 267/141.2
(58) Field of Classification Search
USPC ............. 267/140.14, 140.11, 140.13, 140.15, 267/141.1, 141.2, 141.4; 248/636–638
See application file for complete search history.

(56) References Cited

U.S. PATENT DOCUMENTS

| | | | |
|---|---|---|---|
| 5,386,372 A | 1/1995 | Kobayashi et al. | |
| 5,647,579 A | 7/1997 | Satoh | |
| 5,939,625 A | 8/1999 | Torii et al. | |
| 6,018,689 A | 1/2000 | Kumura et al. | |
| 7,717,409 B2 | 5/2010 | Ishiguro et al. | |
| 7,747,353 B2 | 6/2010 | Mizushima et al. | |
| 2002/0036372 A1 | 3/2002 | Goto et al. | |
| 2005/0001365 A1* | 1/2005 | Kon et al. | 267/140.14 |
| 2007/0013116 A1* | 1/2007 | Nemoto et al. | 267/140.14 |
| 2009/0039577 A1* | 2/2009 | Ishiguro et al. | 267/140.13 |
| 2009/0045560 A1* | 2/2009 | Fueki et al. | 267/140.15 |
| 2012/0013057 A1* | 1/2012 | Nemoto | 267/140.14 |

FOREIGN PATENT DOCUMENTS

| | | |
|---|---|---|
| EP | 0 560 364 A1 | 9/1993 |
| EP | 1 566 564 A1 | 8/2005 |
| EP | 2 098 749 A1 | 9/2009 |
| JP | 04-125360 A | 4/1992 |
| JP | 2001-221287 A | 8/2001 |
| JP | 2002-052940 A | 2/2002 |
| JP | 2005-249013 A | 9/2005 |
| JP | 2007-269049 A | 10/2007 |
| JP | 2008-057559 A | 3/2008 |

\* cited by examiner

*Primary Examiner* — Pamela Rodriguez
(74) *Attorney, Agent, or Firm* — Carrier Blackman & Associates, P.C.; William D. Blackman; Fulchand P. Shende

(57) ABSTRACT

A solenoid driving device with excellent electric power efficiency which drives and controls an actuator including a solenoid and an active vibration isolating support device which includes the solenoid driving device are disclosed. The solenoid driving device includes a booster circuit which boosts a battery voltage, and driving circuits which an actuator with the electric power supplied and boosted by the booster circuit. ACM_ECU200A including a micro computer calculates the magnitude of the vibration of the engine, an engine vibration cycle and a phase lag to obtain the drive frequency of the actuator in the vibration state estimating unit and the phase detecting unit. A booster circuit controlling unit of the micro computer determines the target voltage based on the drive frequency. The target voltage is input to the booster circuit, and the booster circuit supplies the required electric power to the driving circuits at the target voltage.

9 Claims, 13 Drawing Sheets

SOLENOID DRIVING DEVICE AND ACTIVE VIBRATION ISOLATING SUPPORT DEVICE EQUIPPED WITH THE SAME

CROSS REFERENCE TO RELATED APPLICATIONS

This application claims the foreign priority benefit under 35 U.S.C. §119 of Japanese Patent Application No. 2009-79415 filed on Mar. 27, 2009, Japanese Patent Application No. 2009-122853 filed on May 21, 2009, the disclosures of which are incorporated herein by reference.

BACKGROUND OF THE INVENTION

1. Field of the Invention

The present invention relates to a solenoid driving device which drives and controls an actuator by using a solenoid and an active vibration isolating support device which is equipped with the solenoid driving device and elastically supports an engine in a vehicle body.

2. Description of the Related Arts

Japanese Unexamined Patent Application Publication No. 2008-057559 discloses an active vibration isolating support device.

The active vibration isolating support device disclosed in Japanese Unexamined Patent Application Publication No. 2008-057559 includes an ACM (Active Control Mount) controlling ECU (corresponding to a component referred to as "a control unit" in the present invention) and an active control mount. The ACM controlling ECU is communicatively connected to an engine controlling ECU (Electric Control Unit). The engine controlling ECU controls the operation of fuel injectors of the engine based on a crank pulse signal and a TDC (Top Dead Center) pulse signal. The engine controlling ECU also switches to select an all cylinder operation state or selective-cylinder operation states by controlling the operation of the hydraulic actuators of the valve resting mechanism of the engine. Since an engine vibration is different among the all cylinder operation state and the selective-cylinder operation states, the ACM controlling ECU receives the crank pulse signal, the TDC pulse signal and a cylinder stop signal which indicates to stop a cylinder from the engine controlling ECU. The ACM controlling ECU determines an engine vibration cycle such as a vibration mode of primary vibration, $1.5^{th}$ order vibration or secondary vibration, and calculates the amplitude or the phase of the engine vibration to optimally control the active control mount in accordance with the engine vibration state.

Japanese Unexamined Patent Application Publication No. 2007-269049 discloses an active vibration isolating support device which optimally controls an active control mount in a motor-assisted hybrid vehicle based on the operation state of the motor vibration control. The active vibration isolating support device disclosed in Japanese Unexamined Patent Application Publication No. 2007-269049 includes a control map changer for changing a phase correction control map for generating a target current waveform for vibration control of an engine mount depending on the presence/absence of a motor vibration control signal which is supplied to a generator motor. Accordingly, optimum active mount control based on the state of vibration control by the generator motor can be performed.

There has been known a hybrid vehicle including a motor generator for assisting an engine output and an engine which can perform a selective cylinder operation. Since an acceleration function realized by the motor assist is added to the hybrid vehicle, the hybrid vehicle can perform the selective-cylinder operation in a vehicle speed range higher than a vehicle speed range in which a selective-cylinder operation state can be performed by a conventional vehicle (not a hybrid vehicle) which includes an engine capable of performing a selective cylinder operation.

If a selective-cylinder operation is performed in a vehicle speed range higher than the vehicle speed range allowed in the conventional vehicle, the amplitude of the engine vibration becomes greater. Therefore, in order to enhance the vibration absorbing property of the active control mount, the ACM controlling ECU is provided with a booster circuit for boosting the driving voltage supplied to an actuator of the active control mount to, for example, 24V from the battery voltage to realize a displacement of an active control mount which cancels out the increased amplitude of the engine vibration (see Japanese Patent Application Publication No. 2005-249013).

An actuator of the active control mount according to Japanese Patent Application Publication No. 2008-057559 is driven by a solenoid magnet (corresponding to a coil assembly 43). In accordance with the variation of the drive frequency for cancelling out the engine vibration, a voltage required for supplying the same strength of the driving current becomes higher as the drive frequency is increased because the driving current for driving the solenoid magnet needs to be supplied against the counter-electromotive voltage of the solenoid magnet.

Therefore, in a conventional active vibration isolating support device with an active control mount, as shown in FIG. 6A, the maximum voltage $V_{max}$ is set in advance at which the maximum value $I_{Rq}$ of the target current waveform of a driving current required in a high range of the drive frequency $f_{DV}$ [Hz] can be supplied to the solenoid magnet. A booster circuit then boosts the battery voltage $V_B$ to the maximum voltage $V_{max}$ and supplies a driving circuit which performs the PWM (Pulse Width Modulation) control with the electricity to be supplied to the solenoid magnet.

In the above configuration, however, the booster circuit disadvantageously boosts the battery voltage to $V_{max}$ even in a range where the drive frequency $f_{DV}$ [Hz] is low, for example, at the drive frequency f1 [Hz] where V1 is satisfactory as the required voltage value $V_{Rq}$ for supplying the maximum value $I_{Rq}$ of the target current waveform of a required driving current (i.e. the maximum target current value I1) as shown in FIG. 6B. Thus, the electric power of W1' which is greater than W1 is supplied as the required electric power $W_{Rq}$ for driving the solenoid magnet. This causes a problem that the excessive electric power (W1'-W1) is consumed by the booster circuit or the driving circuit wastefully generating heat, which deteriorates an electric power efficiency.

Since the ACM controlling ECU is provided with the booster circuit, the electric power consumption becomes larger, and the amount of the heat generated by the booster circuit or the driving circuit which supplies electricity to the actuator of the active control mount by PWM control is increased. This causes a need for heat radiation and cooling. Especially, when the ACM controlling ECU is arranged in a vehicle compartment of a vehicle and the vehicle is left for a while without any passengers on the vehicle in the idling driving state of the engine, heat radiated from the ACM controlling ECU may not be fully removed.

SUMMARY OF THE INVENTION

The present invention has been made in view of the above problem, and a first object thereof is to provide a solenoid driving device with excellent electric power efficiency which controls an actuator by using a solenoid, and to provide an active vibration isolating support device with excellent electric power efficiency including the solenoid driving device. A second object of the present invention is to provide an active vibration isolating support device which solves the heat radiation problem of an ACM controlling ECU at the time of an idling driving state of an engine, where the ACM controlling ECU boosts the battery voltage and supplies electric power to an actuator.

A first aspect of the invention provides a solenoid driving device including: a booster circuit which boosts a source voltage when supplying electric power; a driving circuit which drives and controls an actuator including a solenoid by supplying the actuator with the electric power which is boosted and supplied by the booster circuit; a drive frequency determining unit which determines a drive frequency at which the actuator is driven based on drive request information for driving the actuator; and a target voltage determining unit which determines on the basis of the determined drive frequency a target voltage value to which the source voltage is boosted and at which the electric power is supplied to the solenoid. In the solenoid driving device, the determined target voltage value is input to the booster circuit, and the booster circuit supplies the driving circuit with the electric power required to drive the solenoid at the target voltage value.

The aforementioned solenoid driving device may further include: a target boosted voltage storing unit which stores in advance the target voltage value to which the source voltage is boosted when supplying the electric power to the solenoid and which is associated with the drive frequency at which the actuator is driven, and the target voltage determining unit which refers to the determined drive frequency to obtain the target voltage value which is associated with the determined drive frequency and is stored in the target boosted voltage storing unit.

A second aspect of the present invention provides an active vibration isolating support device which uses the solenoid driving device according to claim 1 to support an engine in a vehicle body and includes a control unit which estimates a vibration state of the engine based on a signal output from a sensor which detects a rotational fluctuation of the engine and drives to expand or contract the actuator with the solenoid to suppress transmission of vibration, the control unit including: an engine vibration state estimating unit which estimates the vibration state of the engine; the drive frequency determining unit; and the target voltage determining unit. In the active vibration isolating support device, the drive frequency determining unit determines the drive frequency at which the actuator is driven based on the vibration state of the engine which is the drive request information.

The aforementioned active vibration isolating support device may use the aforementioned solenoid driving device to support the engine in the vehicle body and may include the control unit which estimates the vibration state of the engine based on the signal output from the sensor which detects the rotational fluctuation of the engine and drives to expand or contract the actuator with the solenoid to suppress the transmission of vibration. The control unit includes: the drive frequency determining unit which determines the drive frequency at which the actuator is driven based on the estimated vibration state of the engine which is the drive request information; the target boosted voltage storing unit which stores, as the target voltage value, a voltage required to be supplied to the solenoid in association with the drive frequencies at which the actuator is driven and stores the reference maximum target current value which is assumed to correspond to the target voltage value; the target voltage determining unit which refers to the determined drive frequency to obtain and determine the target voltage value and the reference maximum target current value stored in the target boosted voltage storing unit; a target current waveform setting unit which sets a target current waveform which required to drive the actuator based on the estimated vibration state of the engine; a target current waveform maximum value detection unit which detects the maximum target current value of the set target current waveform; a difference calculation unit which calculates the difference between the detected maximum target current value and the obtained reference maximum target current value; and a target voltage correction unit which corrects the target voltage value which has been determined by the target voltage determining unit in accordance with the calculated difference if the detected maximum target current value is equal to or greater than the reference maximum target current value at least by a predetermined value. In the active vibration isolating support device, the target voltage value which has been corrected by the target voltage correction unit is input to the booster circuit as necessary.

A third aspect of the present invention provides an active vibration isolating support device which uses the solenoid driving device to support an engine in a vehicle body and includes a control unit which estimates a vibration state of the engine based on a signal output from a sensor which detects a rotational fluctuation of the engine and drives to expand or contract the actuator with the solenoid to suppress transmission of vibration. The control unit includes: the booster circuit which boosts a battery voltage which is the source voltage; the driving circuit which drives and controls the actuator by supplying the actuator including the solenoid with the electric power boosted and supplied by the booster circuit; the engine vibration state estimating unit which estimates the vibration state of the engine; the drive frequency determining unit which determines the drive frequency at which the actuator is driven on the basis of the estimated vibration state of the engine which is the drive request information; a target current waveform setting unit which sets a target current waveform at which the actuator is driven based on the estimated vibration state of the engine; a target current waveform maximum value detection unit which detects the maximum target current value of the set target current waveform; the target boosted voltage storing unit which stores, as a function or a map of the target voltage value, a voltage required to be supplied to the solenoid, the function or the map using the drive frequency at which the actuator is driven and the maximum target current value of the target current waveform as parameters; the target voltage determining unit which refers to the set determined drive frequency and the detected maximum target current value of the target current waveform to determine the target voltage value based on the function of the map of the target voltage value stored in the target boosted voltage storing unit. The determined target voltage value is input to the booster circuit, and the booster circuit supplies the driving circuit with the electric power required to drive the solenoid.

A fourth embodiment of the present invention provides an active vibration isolating support device which uses the solenoid driving device to support an engine in a vehicle body and includes a control unit which estimates a vibration state of the engine based on a signal output from a sensor which detects a rotational fluctuation of the engine and drives to expand or contract the actuator with the solenoid to suppress transmission of vibration. The control unit includes a booster circuit control unit which outputs a boost stop signal to the booster circuit. When the control unit determines that the estimated vibration state of the engine is equal to or less than a predetermined frequency, the control unit causes the booster circuit control unit to output the boost stop signal to stop the boosting circuit from boosting the battery voltage which is the power supply voltage and controls the booster circuit to supply the battery voltage without boosting the battery voltage.

The battery voltage mentioned here is a generic name of a voltage before boosted by the booster circuit including the output voltage of the battery and a voltage generated by the alternator.

Other features and advantages of the present invention will become more apparent from the following detailed descriptions of the invention when taken in conjunction with the accompanying drawings.

DETAILED DESCRIPTION OF THE PREFERRED EMBODIMENTS

First Embodiment

A first embodiment of the present invention is described in detail below with reference to the accompanying drawings.
<Configuration of Active Vibration Isolating Support Device>

Figure 1:
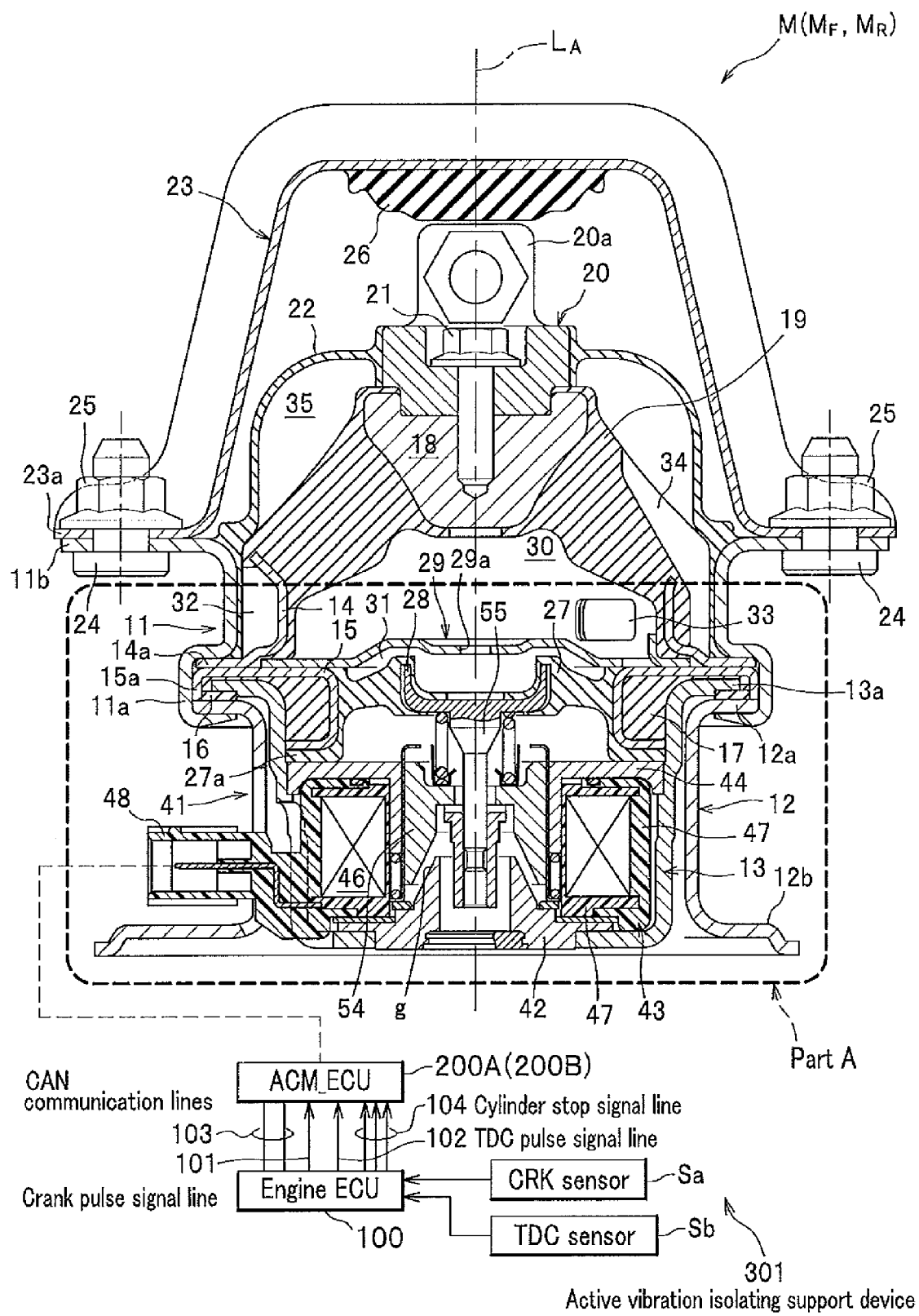
FIG. 1 is a vertical sectional view showing a configuration of an active control mount of an active vibration isolating support device according to a first embodiment of the present invention.
Figure 2:
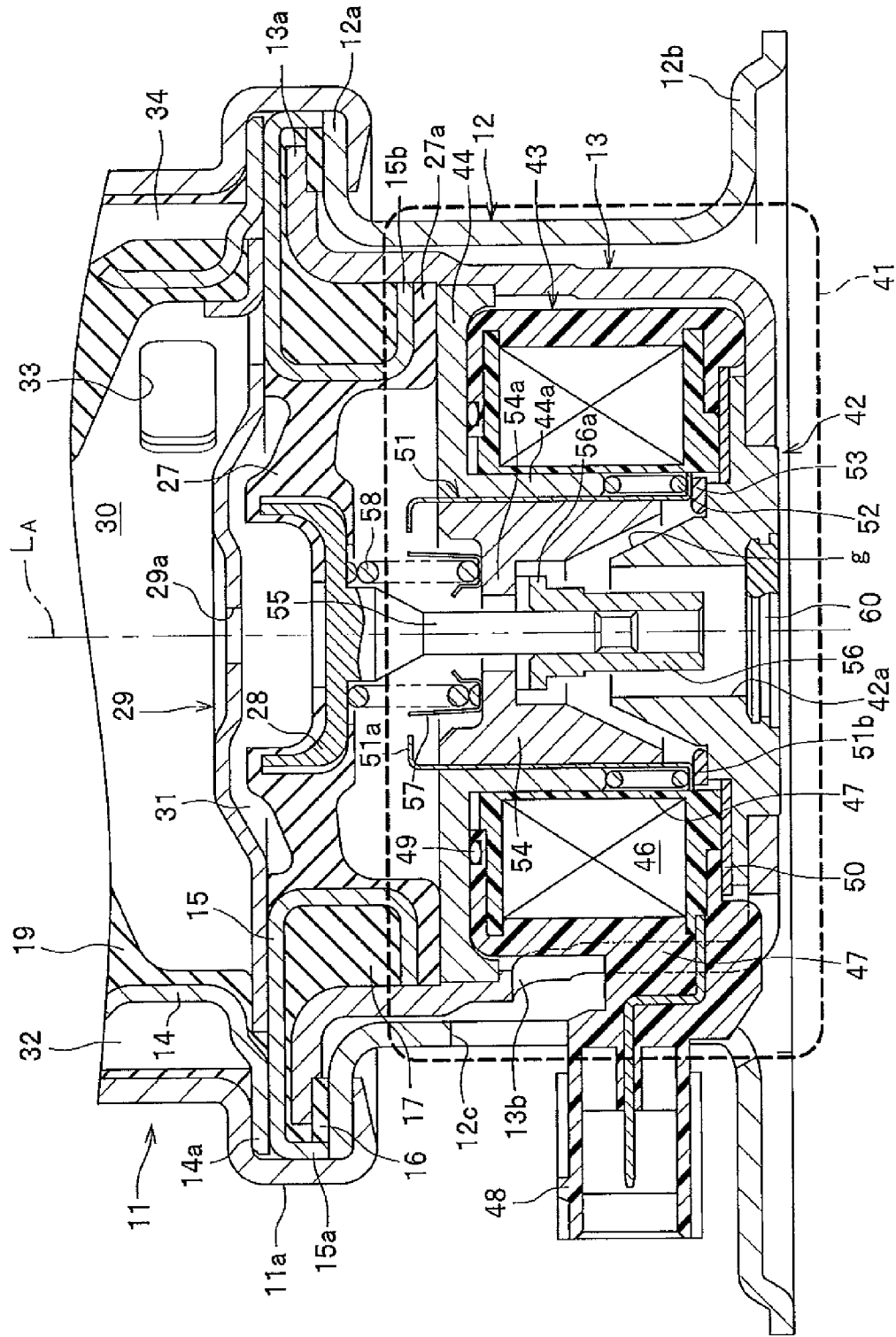
FIG. 2 is an enlarged view of the part A shown in FIG. 1.

FIG. 1 is a vertical sectional view showing a configuration of an active control mount of an active vibration isolating support device according to the first embodiment of the present invention. FIG. 2 is an enlarged view of the part A shown in FIG. 1.

An active vibration isolating support device 301 according to the first embodiment can be driven to extend and contract in a vertical direction, and includes active control mounts (active mounts) $M_F$, $M_R$ which are used to elastically support an engine of a vehicle in a vehicle body frame and are disposed ahead of and behind the engine.

Hereinafter, "active control mounts $M_F$, $M_R$" are just referred to as an "active control mount M" when it is not necessary to distinguish between the active control mounts $M_F$, $M_R$.

Here, the engine is a so-called side-ways mounted transversal V engine with six-cylinders in which one end of a crankshaft (not shown) is connected to a transmission, and the crankshaft is disposed in a direction transverse to a body of the vehicle. Therefore, the engine is disposed such that the direction of the crankshaft is in a direction transverse to a body of the vehicle V, and the vibration isolating support units $M_F$ and $M_R$ are disposed ahead of and behind the engine 102 as a pair to reduce a roll vibration caused by the engine.

The active control mounts $M_F$, $M_R$ are mounted on a location below the center of gravity of the engine to reduce the roll vibration in a front-rear direction of the engine and to elastically support the engine in the vehicle body of the vehicle.

As shown in FIG. 1, the active vibration isolating support apparatus 301 includes an ACM control ECU 200A which controls the active mounts M, M (in FIG. 1, only one active mount M is representatively shown). Hereinafter, the ACM control ECU 200A (control unit) is referred to as an "ACM_ECU 200A".

Figure 3:
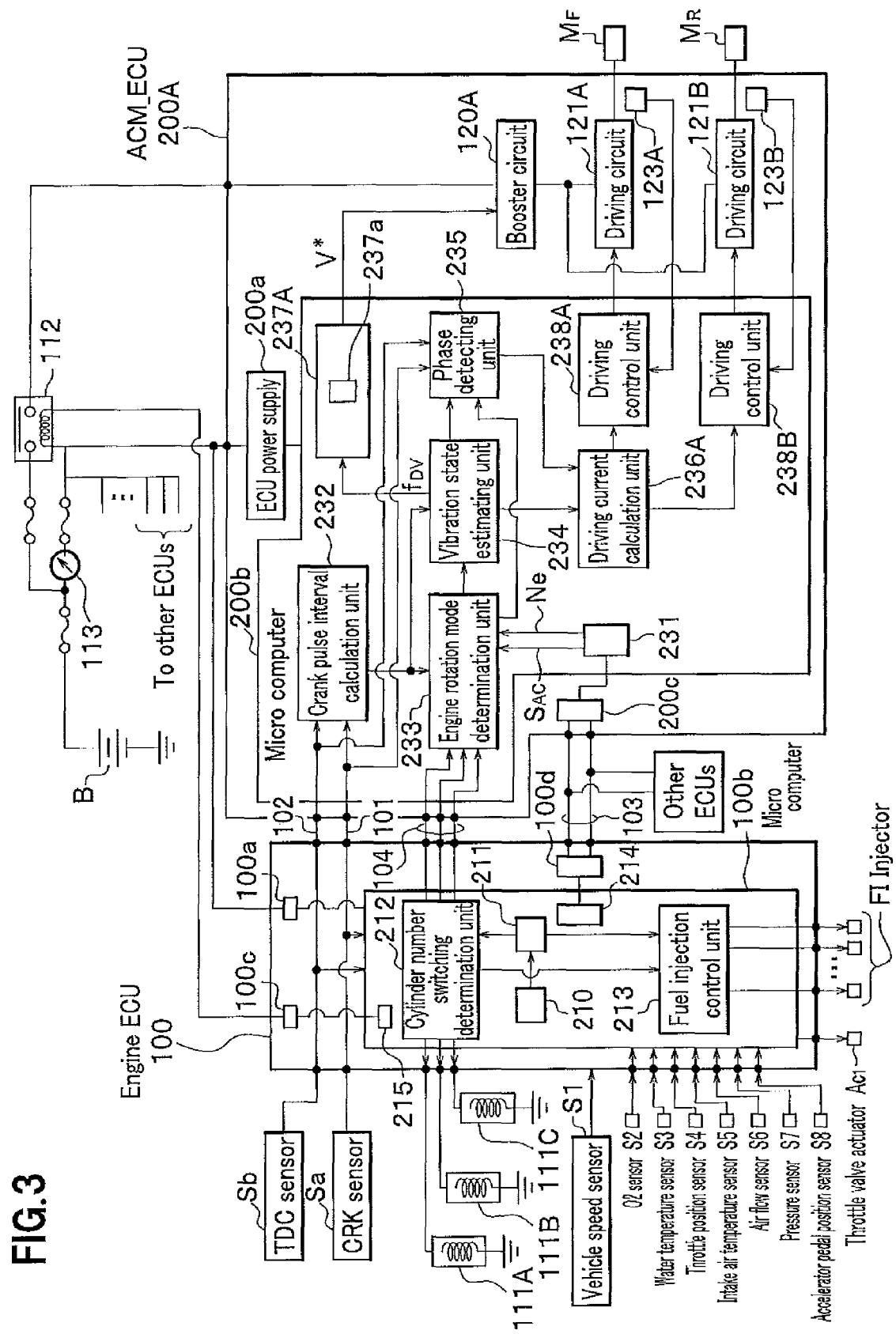
FIG. 3 is a block diagram showing a configuration of the active vibration isolating support device according to the first embodiment.

As shown in FIG. 3, the ACM_ECU 200A is connected to an engine control ECU (hereinafter, referred to as an "engine ECU") 100 which controls revolution speed Ne or output torque, etc. of the engine via a dedicated signal line, a crank pulse signal line 101, a TDC pulse signal line 102, a CAN (Controller Area Network) communication line 103 and a cylinder stop signal line 104.
<Configuration of ACM>

As shown in FIG. 1, an active control mount M has a structure that is substantially symmetrical with respect to an axis $L_A$, and includes a substantially cylindrical upper housing 11, a substantially cylindrical lower housing 12 disposed below the housing 11, an upwardly opening substantially cup-shaped actuator case 13 housed in the lower housing 12, a diaphragm 22 connected on the upper housing 11, an annular first elastic body support ring 14 housed in the upper housing 11, a first elastic body 19 connected on the first elastic body support ring 14, an annular second elastic body support ring 15 housed in the actuator case 13, a second elastic body 27 connected to an inner peripheral side of the second elastic body support ring 15, and a driving unit (actuator) 41 housed in the actuator case 13 and disposed below the second elastic body support ring 15 and the second elastic body 27.

Between a flange unit 11a at the lower end of the upper housing 11 and a flange unit 12a at the upper end of the lower housing 12, a flange unit 13a on the outer periphery of the actuator case 13, an outer peripheral unit 14a of the first elastic body support ring 14, and an upper and outer peripheral unit 15a of a second elastic body support ring 15 are superimposed and joined by crimping. In this process, an annular first floating rubber 16 is disposed between the flange unit 12a and the flange unit 13a, and an annular second floating rubber 17 is disposed between an upper side of the flange unit 13a and lower side of the upper and outer peripheral unit 15a, so that the actuator case 13 is floatingly supported such that it can move up and down relative to the upper housing 11 and the lower housing 12.

The first elastic body support ring 14, and a first elastic body support boss 18 disposed in a concave unit provided on the upper side of a first elastic body 19 are joined by vulcanization bonding at the lower and upper ends of the first elastic body 19 made of a thick rubber. Further, a diaphragm support boss 20 is fixed to an upper face of the first elastic body support boss 18 by a bolt 21. An outer peripheral unit of a diaphragm 22 whose inner peripheral unit is joined by vulcanization bonding to the diaphragm support boss 20, is joined by vulcanization bonding to the upper housing 11.

An engine mounting unit 20a integrally formed with an upper face of the diaphragm support boss 20 is fixed to the engine. (Detailed method for fixing is not shown.) Also, a vehicle body mounting unit 12b at the lower end of the lower housing 12 is fixed to the vehicle body frame (not shown).

A flange unit 23a at the lower end of a stopper member 23 is joined to a flange unit 11b by bolts 24 and nuts 25 at the upper end of the upper housing 11. The engine mounting unit 20a provided on the diaphragm support boss 20 faces a stopper rubber 26 attached to an upper inner face of the stopper member 23 so that the engine mounting unit 20a can touch the stopper rubber 26.

By such a structure, when a large load is input from the engine to the active control mount M, the engine mounting unit 20a touches the stopper rubber 26, thereby reducing excessive displacement of the engine.

An outer peripheral unit of a second elastic body 27 made of a membranous rubber is joined to the inner peripheral face of the second elastic body support ring 15 by vulcanization bonding. At a center portion of the second elastic body 27, a movable member 28 is joined by vulcanization bonding so that the upper unit thereof is embedded in.

A disc-shaped partition member 29 is fixed between an upper face of the second elastic body support ring 15 and the lower unit of the first elastic body support ring 14. A first liquid chamber 30 defined by the first elastic body support ring 14, the first elastic body 19 and the partition member 29, and a second liquid chamber 31 defined by the partition member 29 and the second elastic body 27, communicate with each other via a through hole 29a formed in the center of the partition member 29.

The outer peripheral unit 27a of the second elastic body 27 is held between a lower and outer peripheral unit 15b of the second elastic body support ring 15 (see FIG. 2) and a yoke 44 described below to function as a seal.

Also, an annular through passage 32 is formed between the first elastic body support ring 14 and the upper housing 11. The through passage 32 communicates with the first liquid chamber 30 via a through hole 33, and communicates via a through gap 34 with a third liquid chamber 35 defined by the first elastic body 19 and the diaphragm 22.

The coil assembly 43 includes a cylindrical coil 46 disposed between the stationary core 42 and the yoke 44, and a coil cover 47 covering the outer periphery of the coil 46. The coil cover 47 is integrally formed with a connector 48 running through openings 13b and 12c formed in the actuator case 13 and the lower housing 12 and extending outward, and an electric supply line is connected to the connector 48 to supply electric power to the coil 46. The coil 46 is also referred to as a "solenoid".

The yoke 44 has an annular flange on the upper side of the coil cover 47, and has a cylindrical unit 44a extending downward from the inner peripheral unit of the flange. The yoke 44 has, as it were, a configuration of cylinder having flange. A seal 49 is disposed between an upper face of the coil cover 47 and a lower face of the annular flange of the yoke 44. A seal 50 is disposed between a lower face of the coil cover 47 and an upper face of the stationary core 42. These seals 49 and 50 can prevent water or dust from entering an internal space of the driving unit 41 via the openings 13b and 12c formed in the actuator case 13 and the lower housing 12.

A thin cylindrical bearing member 51 is fitted, in a vertically slidable manner, into an inner peripheral face of a cylindrical unit 44a of the yoke 44. An upper flange 51a and a lower flange 51b are formed at the upper end and the lower end respectively of the bearing member 51, the upper flange 51a being bent radially inward, the lower flange 51b being bent radially outward.

A set spring 52 is disposed in a compressed state between the lower flange 51b and the lower end of the cylindrical unit 44a of the yoke 44. The bearing member 51 is supported by the yoke 44 by the lower flange 51b being pressed against the upper face of the stationary core 42 via an elastic body 53 disposed between the lower face of the lower flange 51b and the stationary core 42 by means of an elastic force of the set spring 52.

A substantially cylindrical movable core 54 is fitted, in a vertically slidable manner, into an inner peripheral face of the bearing member 51. Further, the stationary core 42 and the movable core 54 have hollow center portions on the axis L respectively, and a substantially cylindrical rod 55, which connects to the center of the movable member 28 (on the axis L) and extends downwardly, is inserted there. A nut 56 is tightened around the lower end of the rod 55. The nut 56 has a hollow part at its center, the upper end of the hollow part opens upward, and receives the lower end of the rod 55 in the hollow part. An upper end 56a of the nut 56 has a slightly larger outer diameter than that of its lower portion. An upper face of the upper end 56a touches the lower face of the spring washer 54a.

Also, a set spring 58 is disposed in a compressed state between the spring washer 54a of the movable core 54 and a lower face of the movable member 28. The lower face of the spring washer 54a of the movable core 54 is fixed by being pressed against the upper end 56a of the nut 56 by means of an elastic force of the set spring 58. In this state, the conical inner peripheral unit of the cylindrical unit of the movable core 54 and the conical outer peripheral unit of the stationary core 42 face each other across a conical air gap g.

Relative to the rod 55, the nut 56 is tightened in an opening 42a formed in the center of the stationary core 42 with position adjustment in vertical direction. This opening 42a is blocked by a rubber cup 60.

<Operation of Active Control Mount>

A coil 46 of the driving unit 41 is excited by power supply control from the ACM_ECU 200A so as to move a movable core 54 by sucking force to move a movable member 28 downward. Associated with movement of this movable member 28, a second elastic body 27 which defines a second liquid chamber 31 is downwardly deformed so as to increase the capacity of the second liquid chamber 31. Conversely, when the coil 46 is demagnetized, the second elastic body 27 is upwardly deformed by elastic deformation of itself, the movable member 28 and the movable core 54 move upwardly, and the capacity of the second liquid chamber 31 decreases.

A low frequency engine shake vibration (e.g., 7-20 Hz) is caused by a resonance between the vehicle body and the engine system in a coupled system including the engine, the vehicle body, and a suspension. When the low frequency engine shake vibration occurs while the vehicle is traveling, the first elastic body 19 is deformed by a load input from the engine via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. In this state, when the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. The shape and the dimensions of the through passage 32 and the spring constant of the first elastic body 19 are set such that a low spring constant and high attenuation force are exhibited in the frequency region of the engine shake vibration. Therefore, it is possible to effectively reduce the vibration transmitted from the engine 102 to the vehicle body frame.

Further, in the frequency region of the engine shake vibration, when the engine 102 is in a steady rotating state, the driving unit 41 is maintained in a non-operating state.

When vibration occurs which has a higher frequency than that of the above-mentioned engine shake vibration, that is, vibration during idling or vibration during selective-cylinder operation due to rotation of crankshaft (not shown) of the engine, the liquid within the through passage 32 providing communication between the first liquid chamber 30 and the third liquid chamber 35 becomes stationary and a vibration isolating function cannot be exhibited. Therefore, the driving units 41 of the active control mounts $M_F$, $M_R$ are driven to exhibit a vibration isolating function.

For reference's sake, the idle vibration is caused by low-frequency vibrations of a floor, seats, and a steering wheel during idling. For example, BURUBURU vibration is caused in a four-cylinder engine in a range of 20-35 Hz, and in a six-cylinder engine in a range of 30-50 Hz, and YUSAYUSA vibration is caused in a range of 5-10 Hz by uneven combustion, and the main factor of the YUSAYUSA vibration is roll vibration in the engine.

In order to drive driving units 41, 41, in an active vibration isolating support device 301 including the active control mounts $M_F$, $M_R$ shown in FIG. 1, an ACM_ECU200A calculates a target current waveform based on a crank pulse signal from a crank pulse sensor Sa (shown as a "CRK sensor Sa" in FIG. 1 and referred to as a "CRK sensor Sa" hereinafter), a TDC pulse signal from a TDC sensor (sensor) Sb and a cylinder stop signal, which is described later, and outputs an ACM driving target current value for PWM control, which is obtained by sampling the target current waveform, to driving control units 238A, 238B, which are described later (refer to FIG. 3). The driving control units 238A, 238B then perform feedback control of the energization of the coils 46, 46.

The CRK sensor Sa and a TDC sensor Sb are also referred to as a "sensor which detects an engine rotation fluctuation".

In the driving unit 41 of the active control mount M, when current does not flow through the coil 46 shown in FIG. 2, a movable member 28 is upwardly moved by elastic restorative force of a second elastic body 27. Also, a nut member 56 pushes a movable core 54 up to form a gap g between the movable core 54 and the stationary core 42.

On the other hand, when current is supplied from the ACM_ECU 200A to the coil 46, magnetic flux lines generated by the coil 46 pass through the yoke 44, the movable core 54, and the gap g in an up and down direction to form a closed circuit fed back to the stationary core 42 and the coil 46, thereby moving the movable core 54 downward by sucking force. At this time, the movable core 54 moves the movable member 28 downward via the nut member 56 fixed to the rod 55 connected to the lower side of the movable member 28 so as to deform the second elastic body 27 downward. As a result, since the capacity of the second liquid chamber 31 (see FIG. 1) increases, a liquid in the first liquid chamber 30 compressed by load from the engine (see FIG. 1) flows into the second liquid chamber 31 through the through hole 29a of the partition member 29 to reduce load transmitted from the engine to the vehicle.

Conversely, when current is stopped from being supplied to the coil 46, the movable core 54 is released from the downward sucking force, the second elastic body 27 is deformed upwardly by elastic deformation of itself, and the movable core 54 is pulled up via the nut 56 fixed to the rod 55 and is moved upward. As a result, a gap g is formed. At this time, the second elastic body 27 is moved upwardly and the capacity of the second liquid chamber 31 decreases, whereby a liquid in the second liquid chamber 31 flows into the first liquid chamber 30 decompressed by towed load from the engine through the through hole 29a of the partition member 29 to reduce load transmitted from the engine to the vehicle.

As described above, the ACM_ECU 200A can control vertical motion of the movable member 28 by controlling the current supplied to the coil 46 so as not to transmit the roll vibration of the engine 102 to the vehicle body frame.

The configuration of the engine ECU 100 and the ACM_ECU200A are described in detail below.

<Configuration of Engine ECU>

The configuration of the engine ECU is described with reference to FIGS. 1, 2 and 3. FIG. 3 is a block diagram showing a configuration of the active vibration isolating support device according to the first embodiment.

A configuration of an active vibration isolating support device according to the first embodiment and that of an active vibration isolating support device according to a second embodiment described later are the same except that the active vibration isolating support device according to the second embodiment includes an ACM_ECU 200B instead of the ACM_ECU200A.

An engine ECU 100 includes an ECU power circuit 100a, a micro computer 100b, a ROM (not shown), interface circuits for receiving signals from various sensors, a driving circuit (not shown) for driving cylinder stopping solenoids 111A, 111B and 111C, a relay switch 100c for allowing electricity to flow through the ACM power switch 112, and various interface circuits such as a CAN communication unit 100d.

The engine ECU 100 are communicated with the ACM_ECU200A via a crank pulse signal line 101, a TDC pulse signal line 102 and cylinder stop signal lines 104 which are dedicated signal lines for communication between the engine ECU 100 and the ACM_ECU200A. Further, the engine ECU 100 is connected to the ACM_ECU200A and other ECUs, such as an electrical power steering ECU which controls a steering torque by the assist torque of a motor through bus CAN communication lines 103.

The micro computer 100b is a functional unit which is realized by reading and executing a program stored in the ROM. The micro computer 100b includes an engine rotation speed calculation unit 210, a required output torque calculation unit 211, cylinder number switching determination unit 212, a fuel injection control unit 213 and an engine control parameter transmitting/receiving unit 214.

The engine rotation speed calculation unit 210 calculates an engine rotation speed Ne based on signals from the CRK sensor Sa and the TDC sensor Sb and outputs the calculated engine rotation speed Ne to the required output torque calculation unit 211.

The required output torque calculation unit 211 estimates a speed reducing stage of a driving reducer and a current engine output torque, calculates a required torque and an air intake quantity for generating the required torque, and controls a throttle valve actuator $A_{C1}$ mainly based on a signal from an accelerator pedal position sensor S8 which detects the pressing amount of an accelerator pedal, a signal from the vehicle speed sensor S1 which detects a vehicle speed and the engine rotation speed Ne calculated by the engine rotation speed calculation unit 210.

When the required output torque calculation unit 211 calculates the air intake amount for generating the required torque, the required output torque calculation unit 211 uses, for example, an engine coolant temperature detected by a water temperature sensor S3, a throttle opening detected by a throttle position sensor S4, an intake air temperature detected by an intake air temperature sensor S5, an inspiratory flow rate detected by the air flow sensor S6 and an inspiratory pressure detected by the pressure sensor S7, etc.

The cylinder number switching determination unit 212 determines whether or not the vehicle is in a cruising condition in which the output torque is small based, for example, on the engine rotation speed Ne, the vehicle speed, the estimated current torque and the required torque calculated by the required output torque calculation unit 211. When the cylinder number switching determination unit 212 determines that the vehicle is in a cruising condition in which the output torque is small, the cylinder number switching determination unit 212 changes the number of working cylinders based on a predetermined working cylinder number determination map (not shown) in which an engine rotation speed and a required torque, etc. are used as a parameter. More specifically, the cylinder number switching determination unit 212 controls to switch to a four cylinder operation mode or a three cylinder operation mode by applying a current to one or two of the cylinder stopping solenoids 111A, 111B, 111C to actuate a hydraulic actuator (not shown) of the valve resting mechanism.

When electricity is applied to the cylinder stopping solenoid 111A, the operation of the cylinders #1, #2, #3 are stopped. When electricity is applied to the cylinder stopping solenoid 111B, the operation of the cylinder #3 is stopped. When electricity is applied to the cylinder stopping solenoid 111C, the operation of the cylinder #4 is stopped. Therefore, electricity is applied only to the cylinder stopping solenoids 111B, 111C in the four cylinder operation mode, and electricity is applied only to the cylinder stopping solenoid 111A in the three cylinder operation mode.

When the cylinder number switching determination unit 212 switches to a selective cylinder operation mode, the cylinder number switching determination unit 212 outputs a cylinder stop signal which indicates a cylinder to be stopped from operating to an engine rotation mode determination unit 233 of the ACM_ECU200A via the cylinder stop signal line 104.

The fuel injection control unit 213 sets a fuel injection amount, or more specifically, a fuel injection time in accordance with the required torque calculated by the required output torque calculation unit 211 and the engine rotation speed Ne. The fuel injection control unit 213 also controls the fuel injection of injectors FI of the operating cylinders based on an injection start timing map (not shown) which is set in advance according to the timing of pulse signals from the CRK sensor Sa and the TDC sensor Sb and the engine rotation speed.

The fuel injection control unit 213 adjusts the fuel injection amount based on a signal indicating a concentration of oxygen in an exhaust air from the $O_2$ sensor S2 so that a combustion state is complied with the emission control.

The engine control parameter transmitting/receiving unit 214 outputs the engine rotation speed Ne calculated by the engine rotation speed calculation unit 210, a vehicle speed and an accelerator position sensor signal $S_{AC}$ to the ACM_ECU200A from the micro computer 100b by the CAN communication.

The engine control parameter transmitting/receiving unit 214 outputs parameters such as the engine rotation speed Ne, the vehicle speed, the estimated engine output torque to the electrical power steering ECU (not shown) through the CAN communication.

Furthermore, the engine control parameter transmitting/receiving unit 214 also detects an understeer at the time of acceleration and receives a signal for suppressing the output torque of the engine from the VSA (Vehicle Stability Assist) ECU (not shown).

The micro computer 100b includes as one of its functional units an ACM power relay signal output unit 215 which actuates the relay switch 100c to apply electricity to the solenoid of the ACM power switch 112 when the micro computer 100b starts to operate after the ignition switch 113 (hereinafter referred to as "IG-SW113") is turned ON and the power from the battery B is supplied to the ECU power circuit 100a.

When the IG-SW113 is turned on as shown in FIG. 3, electricity is applied to the engine ECU 100 and the ACM_ECU200A, and the ACM power relay signal output unit 215 turns on the relay switch 100c, applying electricity to the ACM power switch 112. As a result, a DC power supply is applied to the driving circuits 121A, 121B from the battery B via a booster circuit 120A, which is described later.

<Configuration of ACM_ECU>

Next, a configuration of the ACM_ECU is described with reference to FIGS. 3 to 5. The ACM_ECU200A includes an ECU power supply circuit 200a (referred to as "ECU power supply 200a" in FIG. 3), a micro computer 200b, a ROM (not shown), interface circuits for receiving signals from the engine ECU 100, various interface circuits such as a CAN communication unit 200c, a booster circuit 120A, driving circuits 121A, 121B and current sensors 123A, 123B. The ACM_ECU200A is arranged in a vehicle compartment, and heat emitted from the booster circuit 120A and the driving circuits 121A, 121B is treated by an air conditioner which controls a vehicle temperature.

Function of each functional block of the ACM_ECU200A is realized by the micro computer 200b executing programs stored in the ROM (not shown). More specifically, the ACM_ECU200A includes a CAN communication controlling unit 231, a crank pulse interval calculation unit 232, an engine rotation mode determination unit 233, a vibration state estimating unit (which may be also referred to as "a drive frequency determining unit" or "an engine vibration state estimating unit") 234, a phase detecting unit 235, a driving current calculation unit (which may also be referred to as "a target current waveform setting unit") 236A, a booster circuit controlling unit (which may also be referred to as "a target voltage determining unit") 237A and driving control units 238A, 238B.

The ECU power supply 200a, the micro computer 200b, the booster circuit 120A, the driving circuits 121A, 121B constitute a "solenoid driving device".

The CAN communication unit 200c reads signal data transmitted to the ACM_ECU200A, such as a signal indicating the engine rotation speed Ne, an accelerator position signal $S_{AC}$ indicating an accelerator pedal steeping-in amount, and output them to the CAN communication controlling unit 231. The CAN communication controlling unit 231 then outputs the signal indicating the engine rotation speed Ne or the accelerator position signal $S_{AC}$ to the engine rotation mode determination unit 233.

The crank pulse interval calculation unit 232 calculates a crank pulse interval by an internal clock signal of the micro computer 200b, a crank pulse signal and a TDC pulse signal from the engine ECU 100.

A signal indicating the engine rotation speed Ne, a stopped cylinder signal indicating a stopped cylinder and the accelerator position signal $S_{AC}$ are input to the engine rotation mode determination unit 233 from the engine ECU 100, and the crank pulse interval calculated by the crank pulse interval calculation unit 232 is also input to the engine rotation mode determination unit 233.

On the basis of these signals the engine rotation mode determination unit 233 1) determines that the engine rotation mode is an engine starting state when detecting the start of the engine; 2) monitors the increase of the engine rotation speed Ne and determines that the engine rotation mode is an idling driving state when the engine rotation speed Ne reaches a predetermined engine rotation speed; 3) determines whether the engine driving condition is an all cylinder operation state, a two cylinder-stopped operation state or a three cylinder-stopped operation state based on the stopped-cylinder signal; or 4) determines that the engine rotation mode is an idling driving state based on the accelerator position sensor signal.

When the engine rotational mode determining unit 233 determines the rotational mode as the idling state, the all-cylinder operation state, or the selective-cylinder operation state, the vibration state estimating unit 234 detects the rotational fluctuation of the crankshaft from the crank pulse interval based on the above determination. The vibration state estimating unit 234 calculates the magnitude of engine vibration and the cycle of engine vibration (i.e. a drive frequency $f_{DV}$ which drives to extend or contract the driving unit 41) from the Peak to Peak value (interval between a peak to the next peak) of the rotational fluctuation, and outputs the drive frequency $f_{DV}$, the magnitude of the vibration of the engine and a peak timing in the rotational fluctuation of the crank shaft, etc. to the phase detecting unit 235 and the driving current calculation unit 236A. The vibration state estimating unit 234 also inputs the drive frequency $f_{DV}$ to the booster circuit controlling unit 237A.

At this time, the vibration state estimating unit 234 calculates and outputs the magnitude of the vibration of the engine and the drive frequency $f_{DV}$ based on a flag signal indicating the engine rotation mode which is input from the engine rotation mode determination unit 233. For example, since an engine used in this specification is a V-six engine, the engine vibration is assumed to be third order vibration in the all cylinder operation state and is assumed to be 1.5th order vibration in the three cylinder stop operation state. Since the method for estimating this vibrational state is disclosed, for example, in "111 Development of active engine mount", JSAE Annual Congress (Autumn), Sep. 18, 2003, a detailed description thereof will be omitted.

In the case of the idling state, the all-cylinder operation state, or the selective-cylinder operation state, the phase detecting unit 235 compares the timing of peak of the rotational fluctuation of the crankshaft with the timing of TDC and calculates the phase based on the peak-to-peak value of the rotational fluctuation of the crankshaft and the timing of peak of the rotational fluctuation transmitted from the vibration state estimating unit 234, the crank pulse signal and a TDC pulse signal of each of the cylinder from the engine ECU 100, and sends a phase lag which allows the active control mounts $M_F$, $M_R$ to cancel out the engine vibration waveform in every vibration cycle to the actuator driving controlling unit 236A.

The magnitude of the vibration of the engine, the cycle of engine vibration, the phase lag are also referred to as "drive request information".

The actuator driving controlling unit 236A receives the phase lag, and generates the target current waveform which allows each of the active control mounts $M_F$, $M_R$ to suppress the vibration by cancelling out the engine vibration in every vibration cycle based on the engine vibration state (e.g. engine vibration state of $1.5^{th}$ order or third order vibration). The driving current calculation unit 236A samples the target current waveform until the driving current is actually output and obtains an ACM drive target current value for a PWM control, and outputs the ACM drive target current value to the driving control units 238A, 238B.

<Booster Circuit Controlling Unit>

Figure 4:
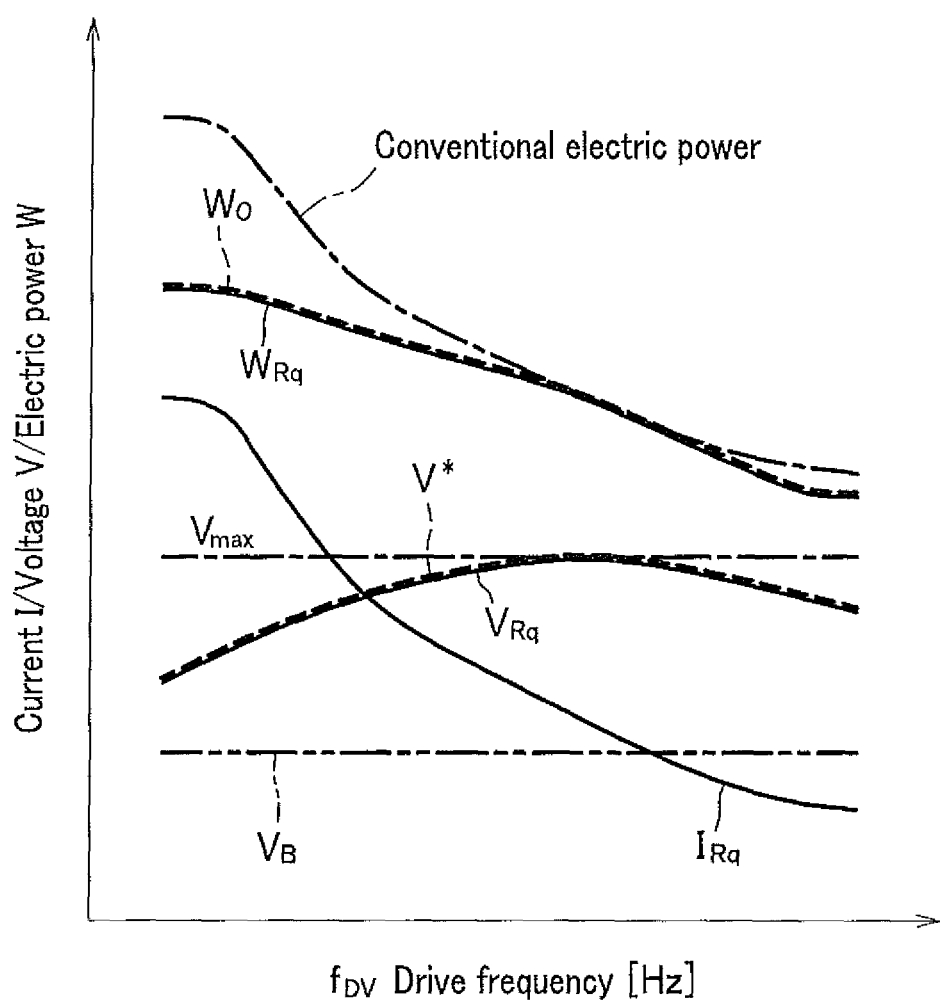
FIG. 4 is a graph for explaining a target voltage V* which is set according to a drive frequency $f_{DV}$.

Next, a booster circuit controlling unit 237A is described which is a characteristic part of the first embodiment with reference to FIGS. 3 and 4. FIG. 4 is a graph for explaining a target voltage V* which is set according to the drive frequency $f_{DV}$.

The booster circuit controlling unit 237A includes a target voltage storing unit (a target boosted voltage storing unit) 237a which stores the target voltage V* set according to the drive frequency $f_{DV}$ in advance.

The booster circuit controlling unit 237A refers to the drive frequency $f_{DV}$, input from the vibration state estimating unit 234, and determines the target voltage V* based on the data of the target voltage V* (a curve indicated by V* in FIG. 4) stored in the target voltage storing unit 237a and inputs the determined target voltage V* to a voltage controlling unit 250a (see FIG. 5) of a micro computer 250 (described later) of the booster circuit 120A.

For example, data of the target voltages V* stored in the target voltage storing unit 237a is stored as a look-up-table which uses the discrete drive frequency $f_{DV}$ as a parameter. The booster circuit controlling unit 237A refers to the drive frequency $f_{DV}$ and searches the look-up-table to calculate the target voltage V* by interpolation.

Alternatively, the data of the target voltage V* of the target voltage storing unit 237a may be stored as a functional form which uses the drive frequency $f_{DV}$ as a parameter. The booster circuit controlling unit 237A may calculate the target voltage V* based on the drive frequency $f_{DV}$.

Calculation of the target voltage V* from the data of the target voltages V* stored in the target voltage storing unit 237a may also be referred to as "obtaining a target voltage value stored in the target boosted voltage storing unit and determining a target voltage value".

In FIG. 4, the horizontal axis indicates the drive frequency $f_{DV}$ [Hz], and the vertical axis indicates a current I, a voltage V, an electric power W which are supplied from the booster circuit 120A. In FIG. 4, $V_B$ indicates a battery voltage. $V_{Rq}$ indicates a required voltage value required for the active control mounts $M_F$, $M_R$ at the drive frequency $f_{DV}$ based on an engine vibration characteristic which has been experimentally obtained in advance. $V_{Rq}$ is the same as the target voltage V* which is set according to the drive frequency $f_{DV}$ and is stored in the target voltage storing unit 237a. Similarly, a required current value $I_{Rq}$ is the maximum value of the target current waveform required for the active control mounts $M_F$, $M_R$ at the drive frequency $f_{DV}$ based on the engine vibration characteristic which has been experimentally obtained in advance.

The target voltage V* is set in advance such that the required current value $I_{Rq}$ can be supplied to the booster circuit 120A against a counter electromotive voltage which is generated in the coils (solenoid) 46 of the active control mounts $M_F$, $M_R$ and increases as the frequency $f_{DV}$ increases.

In FIG. 4, the maximum value of the required voltage value $V_{Rq}$ which depends on the drive frequency $f_{DV}$ is shown as $V_{max}$, required electric power which is the product of the required voltage value $V_{Rq}$ and the required current value $I_{Rq}$ is shown as $W_{Rq}$, and the actual electricity supplied by the booster circuit 120A is shown as Wo. In this embodiment, Wo is equal to $W_{Rq}$.

The actual electricity supplied by the booster circuit 120A when the target voltage V* is constantly set to be $V_{max}$ as conventional is shown as "conventional electricity".

<Booster Circuit>

A configuration of the booster circuit 120A is described in detail with reference to FIGS. 1, 3 to 5. FIG. 5 is a functional block diagram showing the configuration of the booster circuit 120A of the ACM_ECU 200A.

The DC power supply supplied from the battery B (see FIG. 3) or the alternator is connected to the booster circuit 120A when the ACM power switch 112 is fed with electricity. The booster circuit 120A is comprised, for example, of a step-up chopper circuit and includes a micro computer 250, a reactor L, a switching element 253, a diode D, a condenser C, a voltage sensor which detects the voltage applied to the condenser C by detecting the voltage value $V_0$ at the middle of the resistances $R_1$ and $R_2$ which are provided between the output side (+ side) and the earth ground, a current sensor which detects a current value I, and A/D converters 255, 256.

Figure 5:
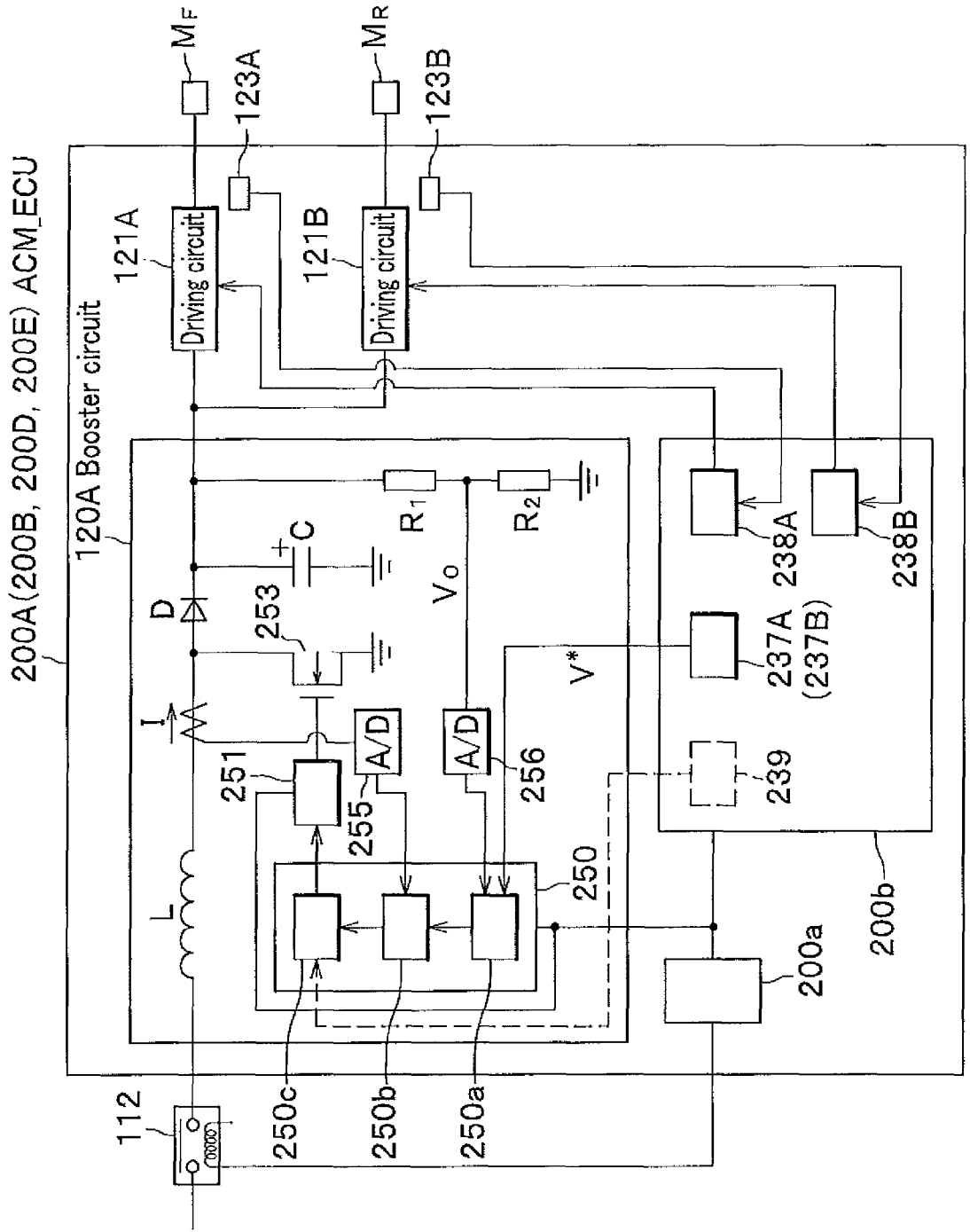
FIG. 5 is a functional block diagram showing a configuration of a booster circuit of an ACM_ECU.

In FIG. 5, a n-channel type MOSFET is used as the switching element 253, and the output of the gate driving circuit 251 which is controlled by a micro computer 250 to control the gate voltage of MOSFET is connected to a gate terminal of the switching element 253.

The signal of the voltage sensor is converted into a digital value by the A/D converter 256 and is input to a current control unit 250a of the micro computer 250. The signal of the current sensor which detects a current value I is converted into a digital value by the A/D converter 255 and is input to the current control unit 250b of the micro computer 250 which is described later.

The micro computer 250 includes a ROM, a RAM and an input/output interface which are not shown. The micro computer 250 includes a voltage controlling unit 250a, a current control unit 250b and a PWM controlling unit 250c which generates a duty signal to be output to the gate driving circuit 251. These units are functional blocks which are executed by programs and data stored in the ROM in advance.

The voltage controlling unit 250a sets a duty ratio in accordance with the deviation of the target voltage V* input from the booster circuit controlling unit 237A and the voltage value $V_0$ from the voltage sensor, and outputs it to the current control unit 250b. The current control unit 250b corrects the duty ratio set by the voltage controlling unit 250a according to the current value I from the current sensor, and outputs it to the PWM controlling unit 250c. The PWM controlling unit 250c generates a duty signal based on the duty ratio input from the current control unit 250b, and outputs it to the gate driving circuit 251.

As a result, the booster circuit 120A supplies the electric power Wo at the target voltage V* input from the booster circuit controlling unit 237A (see FIG. 4) to the driving circuits 121A, 121B.

The driving circuits 121A, 121B are respectively comprised of switching elements, and On and Off of the PWM control of the driving circuits 121A, 121B are respectively controlled by the driving control units 238A, 238B to control the current values which are respectively supplied to the driving units 41, 41 (see FIG. 1) of the active control mounts $M_F$, $M_R$. The current values supplied from the driving circuits 121A, 121B are detected by the current sensors 123A, 123B, and the detected current values are input to the driving control units 238A, 238B, respectively.

The driving control units 238A, 238B detect the deviation of the ACM drive target current values and the detected current values, respectively, and correct PWM duty commands for new ACM drive target current values for the next cycle of the PWM control based on the detected deviation, and outputs the PWM duty commands to the driving circuits 121A, 121B, respectively.

As described above, the driving control units 238A, 238B supply electricity to the driving units 41, 41 of the active control mounts $M_F$, $M_R$ by feedbacking the PWM duty commands for the ACM drive target current values.

Figure 6A:
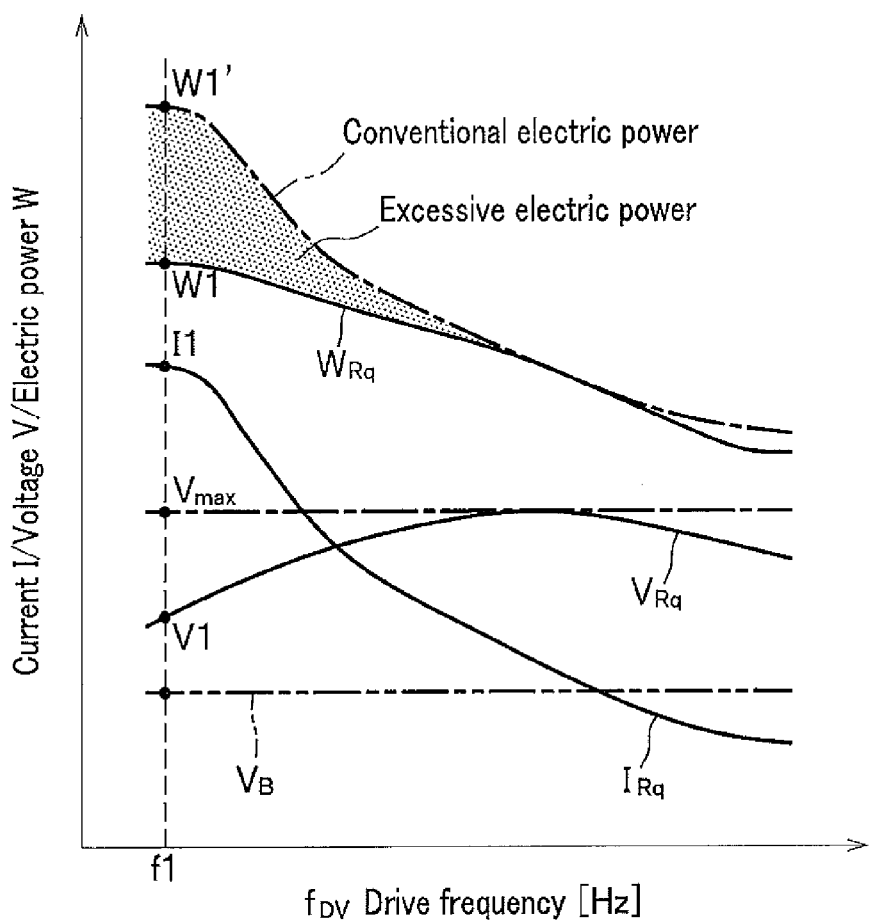
FIG. 6A is a graph showing a curve of a required voltage value $V_{Rq}$ which is raised by the booster circuit from a battery voltage $V_B$ to a voltage value corresponding to a drive frequency; the maximum value $V_{max}$ of the required voltage value $V_{Rq}$, a curve of a required current value $I_{Rq}$ which corresponds to the drive frequency and is the maximum value of the target current waveform estimated when the required voltage value $V_{Rq}$ is set; a curve of a required electric power $W_{Rq}$ which is the product of the required voltage value $V_{Rq}$ and the required current value $I_{Rq}$; and a curve of a conventional electric power required when the electric power corresponding to the maximum value $V_{max}$ of the required voltage value $V_{Rq}$ is always supplied from the booster circuit 120A as in the conventional technique.
Figure 6B:
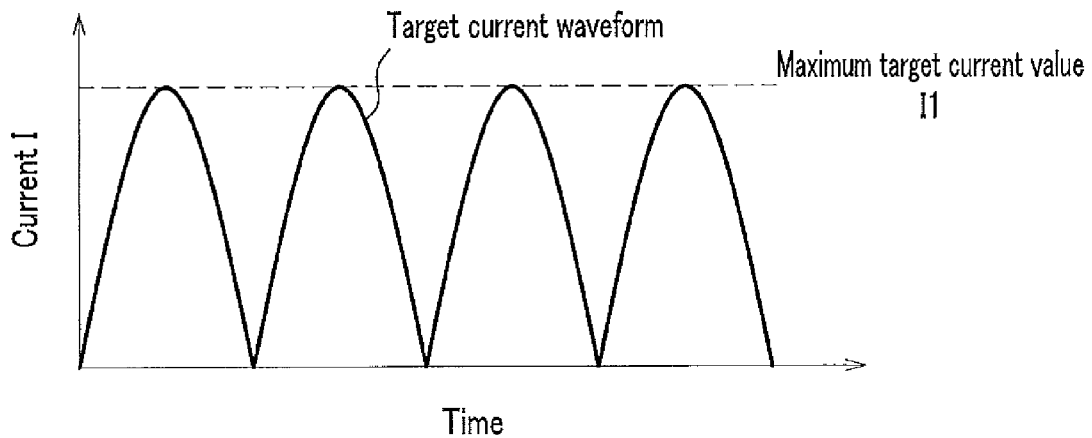
FIG. 6B is a graph showing the maximum target current value I1 which is the maximum value $I_{Rq}$ of the target current waveform for a required drive current at the drive frequency f1.

Next, effects of the first embodiment are described with reference to FIGS. 4 and 6. FIGS. 6A and 6B are graphs for explaining effects of the first embodiment of the present invention. FIG. 6A is a graph showing a curve of a required voltage value $V_{Rq}$ corresponding to the drive frequency to which a battery voltage $V_B$ is boosted by the booster circuit; the maximum value $V_{max}$ of the required voltage value $V_{Rq}$, a curve of a required current value $I_{Rq}$ which corresponds to the drive frequency and is the maximum value of the target current waveform assumed when the required voltage value $V_{Rq}$ is set; a curve of required electric power $W_{Rq}$ which is the product of the required voltage value $V_{Rq}$ and the required current value $I_{Rq}$; and a curve of conventional electric power required when the electric power corresponding to the maximum value $V_{max}$ of the required voltage value $V_{Rq}$ is always supplied from the booster circuit 120A as in the conventional technique. FIG. 6B is a graph showing the maximum target current value I1 which is the maximum value $I_{Rq}$ of the target current waveform for a required drive current at the drive frequency f1.

In FIG. 6A, the horizontal axis indicates the drive frequency $f_{DV}$ [Hz] and the vertical axis indicates the current I, the voltage V and the electric power W supplied from the booster circuit 120A. In FIGS. 6A and 6B, the descriptions of curves and lines which are assigned the similar reference symbols as in FIG. 4 are omitted.

The target voltage V* is set in advance such that the required current value $I_{Rq}$ can be supplied to the booster circuit 120A against a counter electromotive voltage which is generated in the coils (solenoid) 46 of the active control mounts $M_F$, $M_R$ and increases as the frequency $f_{DV}$ increases.

In accordance with the first embodiment, the booster circuit controlling unit 237A of the ACM_ECU 200A performs a follow-up control in such a manner that the booster circuit 120A outputs at the target voltage V* (see FIG. 4) the electric power Wo (see FIG. 4) corresponding to the required voltage value $V_{Rq}$ and the required current value $I_{Rq}$ in accordance with the drive frequency $f_{DV}$ (i.e. vibration frequency of an engine vibration characteristic). Thus, the responsiveness of the actuator including the solenoid can be enhanced.

In a range where the drive frequency $f_{DV}$ [Hz] is small, for example, at the drive frequency f1 [Hz], V1 is sufficient as the required voltage value $V_{Rq}$ to supply the maximum value $I_{Rq}$ (i.e. the maximum target current value I1) of the target current waveform for the required drive current as shown in FIG. 6B. Therefore, it is sufficient for the booster circuit 120A to increase the battery voltage only to V1 to supply the electric power W1 of the required electric power $W_{Rq}$ which is necessary to drive the solenoid magnet.

As shown by the difference (W1'-W1) (i.e. "a redundant electric power area" indicated by the dashed line in FIG. 6A) between the supplied electric power W1 in the present embodiment and the supplied electric power W1' in the conventional technique in which the booster circuit 120A is controlled to constantly supply the target voltage value of the maximum value $V_{max}$ for the required voltage value $V_{Rq}$, the present invention makes it possible to eliminate the electric power which is wastefully consumed by the booster circuit 120A and the driving circuits 121A, 121B vainly generating heat in an area where the drive frequency $f_{DV}$ is small.

The heat dissipation from the ACM_ECU200A, especially from the booster circuit 120A and the driving circuits 121A and 121B is reduced.

As the engine vibration frequency is low when, for example, the engine is the idling driving state, the booster circuit 120A is controlled to supply electricity at a low target voltage V* which corresponds to the low engine vibration frequency, and thus the temperature of the booster circuit 120A and the driving circuits 121A, 121B of the present invention becomes lower than that of the booster circuit and the driving circuits in the conventional technique.

The selective cylinder operation of the engine is performed only when a vehicle is running (i.e. when passengers are on the vehicle). On the other hand, an engine may be operated without any passengers, and an air conditioner in a cabin may not be operated in the idling driving state. Therefore, it is necessary to make the temperature specification of the components of the ACM_ECU200A be high. The present invention allows to lower the temperature specification of the components of the ACM_ECU200A and thus to reduce the ACM_ECU200A in size and weight since in the present invention it is not necessary to wastefully increase the battery voltage to the target voltage $V_{max}$ when controlling to supply electric power as in the conventional technique.

Modification of the First Embodiment

Figure 7:
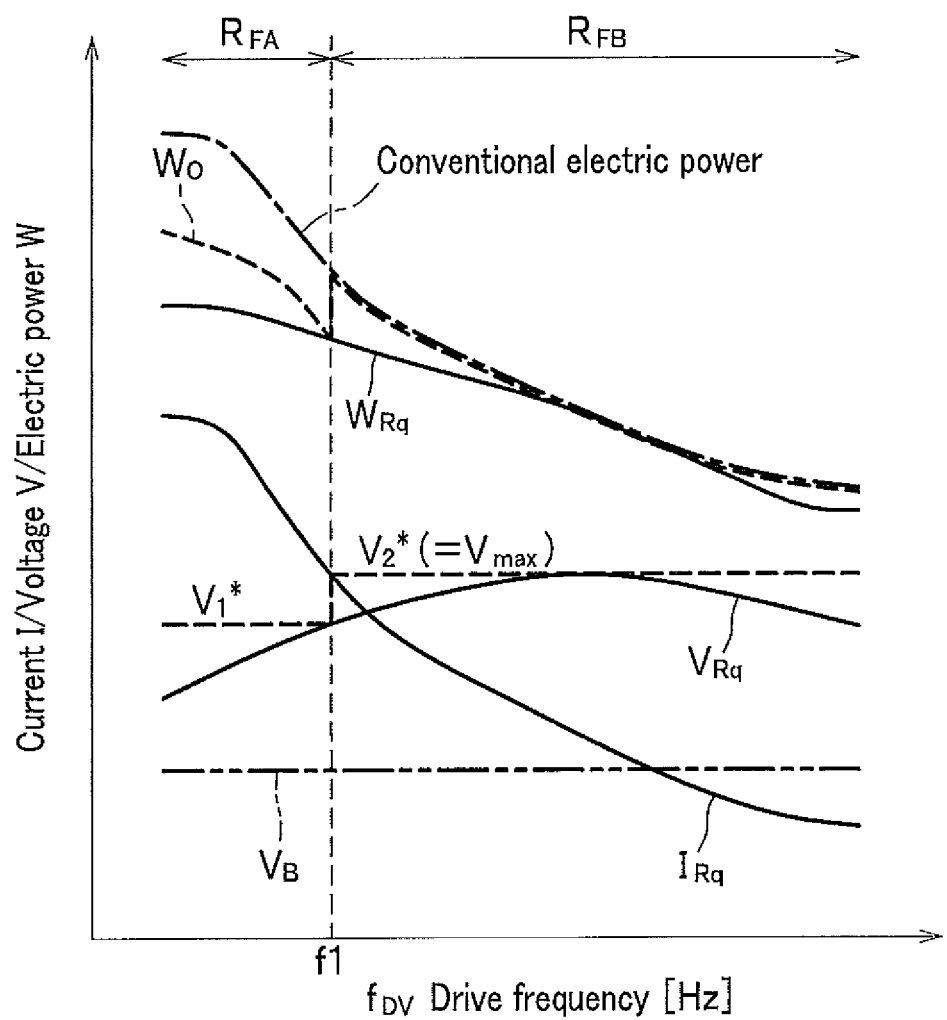
FIG. 7 is a graph for explaining a modification of the first embodiment.

Next, a modification of the first embodiment is described with reference to FIG. 7. FIG. 7 is a graph for explaining the modification of the first embodiment. In FIG. 7, the horizontal axis indicates the drive frequency $f_{DV}$ [Hz] and the vertical axis indicates a current I, a voltage V, and electric power W supplied from the booster circuit 120A. In FIG. 7, the descriptions of curves and lines which are assigned the same reference symbols as those in FIG. 4 are omitted.

In the first embodiment, the target voltage V* is continuously set according to the required voltage value $V_{Rq}$ and the drive frequency $f_{DV}$ in the booster circuit controlling unit 237A, however, an embodiment of the present invention is not limited to this.

As shown in FIG. 7, regarding the required voltage value $V_{Rq}$ which varies continuously according to the drive frequency $f_{DV}$, the required voltage value $V_{Rq}$ at the drive frequency $f_1$ may be set as the target voltage $V_1$* in the lower frequency range $R_{F4}$, which is a range below the predetermined drive frequency f1 including the predetermined drive frequency f1, and the maximum value of the required voltage value $V_{Rq}$ may be set as the target voltage $V_2$* in the high frequency range $R_{FB}$, which is a range over the predetermined drive frequency f1.

By making the control of the target voltage V* be the simplified two stage control, the control of the voltage controlling unit 250a of the micro computer 250 in the booster circuit 120A can be simplified, and a follow-up performance to the required electric power $W_{Rq}$ can be enhanced compared with the conventional technique. Even in the simplified control of the target voltage V*, the electric power Wo which is supplied to the booster circuit 120A (indicated by the dashed line in FIG. 7) allows to reduce wasteful supply of the electric power compared with the "conventional electric power" (indicated by the alternate long-short dash line) supplied to the booster circuit 120A in the low frequency range $R_{F4}$. In the high frequency range $R_{FB}$, the same electric power as the "conventional electric power" (indicated by the alternate long-short dash line) is supplied to the booster circuit 120A.

Second Embodiment

Figure 8:
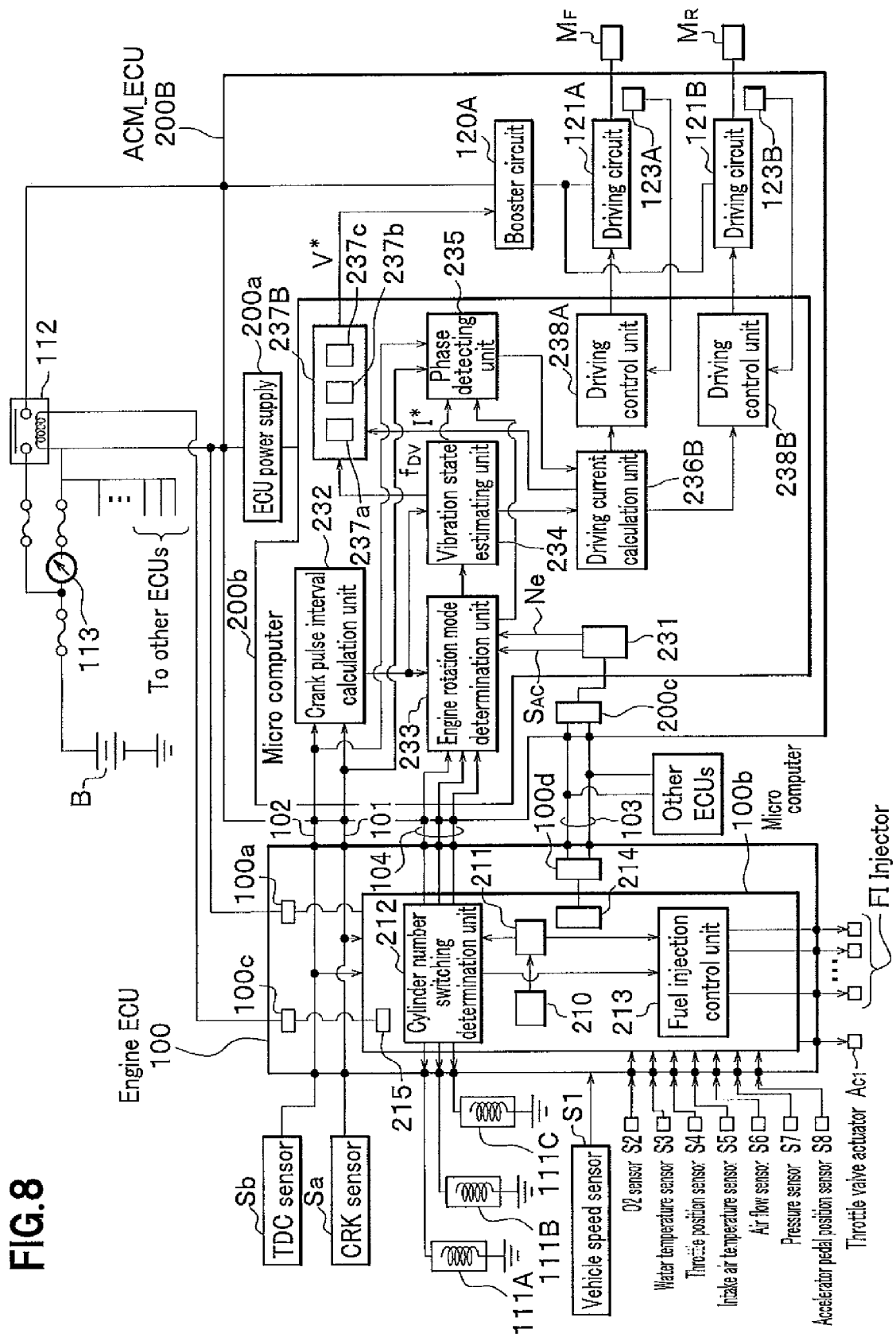
FIG. 8 is a functional block diagram showing a configuration of an active vibration isolating support device according to a second embodiment of the present invention.
Figure 9:
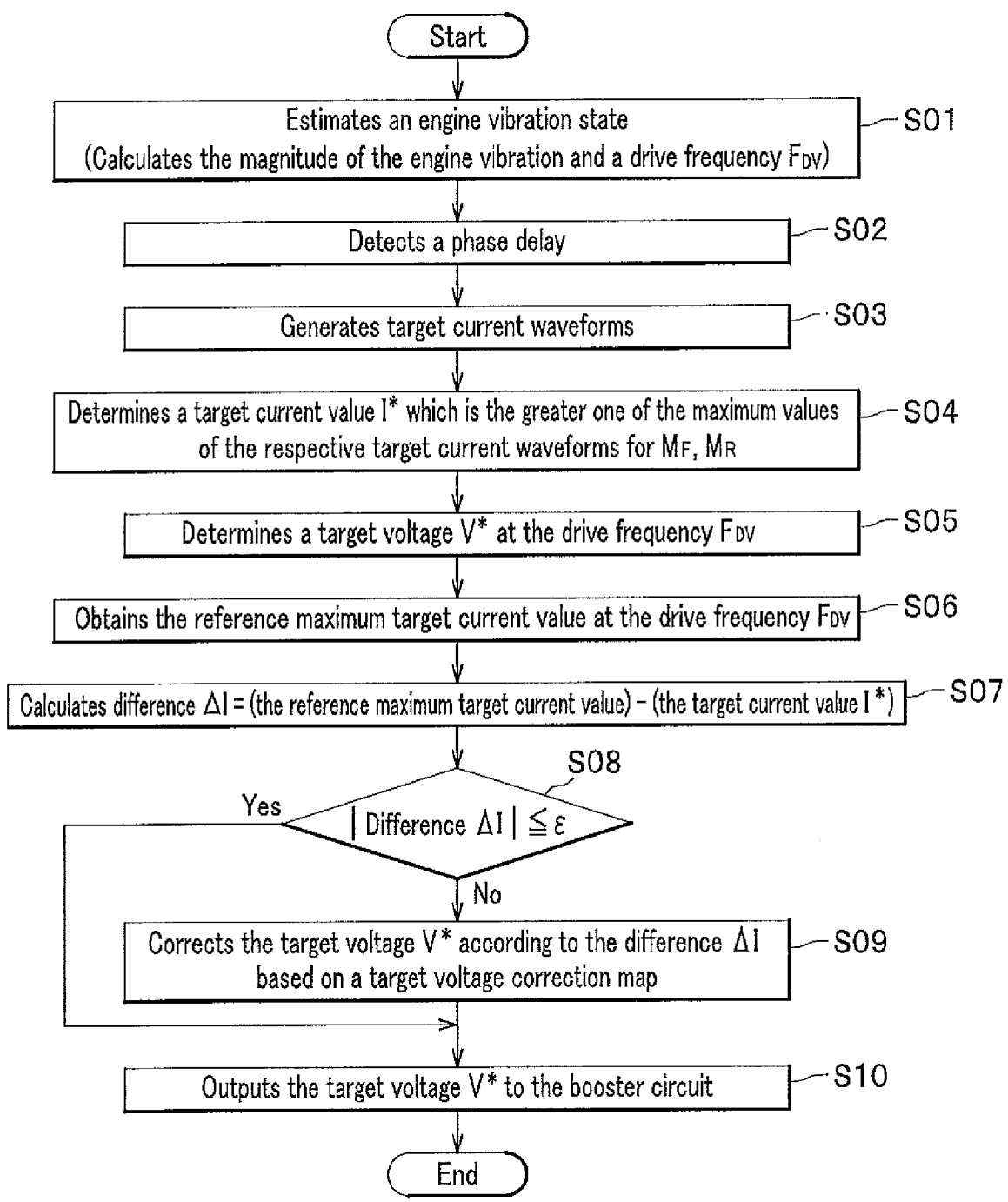
FIG. 9 is a flow chart showing a control process performed to determine the target voltage V* in the second embodiment.

Next, a second embodiment of the present invention is described with reference to FIGS. 1, 8 and 9. FIG. 8 is a functional block diagram showing a configuration of an active vibration isolating support device according to the second embodiment.

A configuration of the active vibration isolating support device according to the second embodiment is substantially the same as that of the active vibration isolating support device of the first embodiment except that the ACM_ECU200B is provided instead of the ACM_ECU200A in the second embodiment.

More specifically, the ACM_ECU200B of the second embodiment includes a driving current calculation unit (which may also be referred to as "a target current waveform setting unit" or "a target current waveform maximum value detection unit") 236B instead of the driving current calculation unit 236A and a booster circuit controlling unit (which may also be referred to as "a target voltage determining unit", "a difference calculation unit" or "a target voltage correction unit") 237B instead of the booster circuit controlling unit 237A. Components which correspond to those of the first embodiment are assigned similar reference symbols and the description thereof will be omitted.

Similarly to the first embodiment, the driving current calculation unit 236B generates a target current waveform which allows each of the active control mounts $M_F$, $M_R$ to suppress the vibration by cancelling out the engine vibration in every vibration cycle. The driving current calculation unit 236B samples the target current waveform until the driving current is actually output, obtains an ACM drive target current value for a PWM control, and outputs the ACM drive target current value to the driving control units 238A, 238B.

Furthermore, the driving current calculation unit 236B obtains the maximum values of the target current waveforms which are generated for the active control mounts $M_F$, $M_R$, respectively, and inputs the maximum value of the target current waveforms (i.e. the greater one of the two maximum values) to the booster circuit controlling unit 237B as the target current value I*.

The booster circuit controlling unit 237B includes a reference maximum target current value data storing unit 237b and a target voltage value correction map 237c in addition to the target voltage storing unit 237a as shown in FIG. 8.

The maximum target current value data storing unit 237b stores the maximum value (hereinafter referred to as "a reference maximum target current value") of the target current waveform corresponding to the drive frequency $f_{DV}$ which is used as a presumption for setting data of the target voltage V* set according to the drive frequency $f_{DV}$ in advance. The reference maximum target current value corresponds to the required current value $I_{Rq}$ which has been explained with reference to FIG. 4 in the first embodiment.

The target voltage value correction map 237c is a map for correcting the target voltage V* in accordance with the drive frequency $f_{DV}$ and a difference ΔI (see FIG. 9) which is described later. The target voltage value correction map 237c is configured to receive the target current value I* which is input from the driving current calculation unit 236B, to calculate the difference ΔI between the target current value I* and the reference maximum target current value at the drive frequency $f_{DV}$ in the booster circuit controlling unit 237B, and to refer to the drive frequency $f_{DV}$ and the difference ΔI for calculating the correction amount of the target voltage V*.

The target voltage value correction map 237c is a three dimensional map for calculating the correction amount of the target voltage V* by using the drive frequency $f_{DV}$ and the difference ΔI as parameters. The correction amount of the target voltage V* has such a tendency that the correction amount of the target voltage V* increases in the positive direction as the drive frequency $f_{DV}$ increases with the negative difference ΔI being constant. In contrast, the correction amount of the target voltage V* also has such a tendency that the correction amount of the target voltage V* increases in the negative direction as the drive frequency $f_{DV}$ increases with the positive difference ΔI being constant.

Next, a method for correcting the target voltage V* is explained with reference to FIGS. 4, 5, 8 and 9. FIG. 9 is a flow chart showing a control process performed to determine the target voltage V* in the second embodiment.

In step S01, the vibration state estimating unit 234 (see FIG. 8) estimates an engine vibration state based on an engine rotation mode determined by the engine rotation mode determination unit 233 and a crank pulse interval determined by the crank pulse interval calculation unit 232. More specifically, the vibration state estimating unit 234 calculates the magnitude of the vibration of the engine and a frequency of the engine vibration, which is a drive frequency $f_{DV}$ for operating the active control mounts $M_F$, $M_R$ to suppress the engine vibration.

In step S02 in the case of the idling state, the all-cylinder operation state, or the selective-cylinder operation state, the phase detecting unit 235 (see FIG. 8) compares the peak timing of the rotational fluctuation of the crankshaft and the timing of TDC and calculates the phase based on the peak-to-peak value of the rotational fluctuation of the crankshaft and the timing of peak of the rotational fluctuation from the vibration state estimating unit 234 and the crank pulse signal and a TDC pulse signal of each cylinder from the engine ECU 100, and calculates a phase lag which allows the active control mounts $M_F$, $M_R$ to cancel out the engine vibration waveform in every vibration cycle (detection of a phase lag).

In step S03, the actuator driving controlling unit 236B (see FIG. 8) generates a target current waveform which allows each of the active control mounts $M_F$, $M_R$ to suppress the vibration by cancelling out the engine vibration in every vibration cycle (this process may be referred to as "generating a target current waveform").

In step S04, the driving current calculation unit 236B obtains the maximum values of the target current waveforms which are generated for the active control mounts $M_F$, $M_R$, respectively, and determines the greater one of the two maximum values of the target current waveforms as a target current value I* (the process may be referred to as "determining as a target current value I* the greater one of the two maximum values of the target current waveforms for the active control mounts $M_F$, $M_R$). The driving current calculation unit 236B inputs the determined target current value I* to the booster circuit controlling unit 237B.

In step S05, the booster circuit controlling unit 237B (see FIG. 8) refers to the drive frequency $f_{DV}$ which is input from the vibration state estimating unit 234 and determines the target voltage V* based on data of the target voltage V* (a curve indicated by V* in FIG. 4) stored in the target voltage storing unit 237a (the process may be referred to as "determining the target voltage V* at the drive frequency $f_{DV}$").

In step S06, the booster circuit controlling unit 237B refers to the drive frequency $f_{DV}$ input from the vibration state estimating unit 234 and obtains a reference maximum target current value based on the data of the reference maximum target current value (a curve indicated by $I_{Rq}$ shown in FIG. 4) which is stored in the reference maximum target current value data storing unit 237b (the process may be referred to as "obtaining the reference maximum target current value at the drive frequency $f_{DV}$"). In step S07, the booster circuit controlling unit 237B calculates the difference ΔI=(reference maximum target current value)−(target current value I*).

In step S08, the booster circuit controlling unit 237B determines whether or not the absolute value of the difference ΔI is equal to or less than a predetermined threshold value ε. If the absolute value of the difference ΔI is equal to or less than the predetermined threshold value ε (Yes), the processing proceeds to step S10, and if the absolute value of the difference ΔI is greater than the predetermined threshold value ε(No) the processing proceeds to step S09.

The threshold value ε here is a threshold value for determining whether or not the target voltage V* determined in step S05 needs to be corrected.

Depending on the drive frequency $f_{DV}$, the range of the negative difference ΔI that can be absorbed in the margin of the target voltage V* determined in step S05 is different. In general, data of the target voltage V* is set in advance so that the target voltage V* can supply a current which is greater than the maximum current value by some margin. As the drive frequency $f_{DV}$ increases, the counter electromotive voltage also becomes greater. Therefore, when the negative difference ΔI is assumed to be constant, it is necessary to correct the target voltage V* to be greater as the drive frequency $f_{DV}$ increases so that the booster circuit 120A (see FIG. 8) can supply the target drive current value I* which is the maximum value of the target current waveform to the driving circuits 121A, 121B (see FIG. 8). Accordingly, the threshold value ε is preferably set in accordance with the drive frequency $f_{DV}$.

In step S09, the booster circuit controlling unit 237B refers to the drive frequency $f_{DV}$ calculated in step S01 and the difference ΔI calculated in step S07 to calculate the correction amount of the target voltage V* based on the target voltage value correction map 237c, and adds the correction amount to the target voltage V* to generate a new target voltage V* (a target voltage V*, this process may be referred to as "correcting the target voltage V* in accordance with the difference ΔI based on the target voltage value correction map").

In step S10, the booster circuit controlling unit 237B outputs the target voltage V* to the booster circuit 120A. As shown in FIG. 5, the target voltage V* is input to the voltage controlling unit 250a of the micro computer 250 of the booster circuit 120A.

As described above, the control process for determining the target voltage V* is executed and completed.

The process of step S01 of the flowchart for determining the target voltage value V* in the first embodiment is executed by an "engine vibration state estimating unit" or a "drive frequency determining unit". The process of step S03 of the flowchart is executed by a "target current waveform setting unit". The process of step S04 of the flowchart is executed by a "target current waveform maximum value detection unit". The process of steps S06, S07 of the flowchart is executed by a "difference calculation unit". The process of steps S08, S09 of the flowchart is executed by a "target voltage correction unit".

In accordance with the second embodiment, even when the target current value I*, which is the maximum value of the target current waveform for suppressing the actual engine vibration is more than the reference maximum target current value by the threshold value $\epsilon$, the target voltage V* is corrected to be increased in accordance with the negative difference $\Delta I$ and the drive frequency $f_{DV}$ which allows to enhance the responsiveness of the driving units 41, 41 (see FIG. 1). If the target current value I*, which is the maximum value of the target current waveform for suppressing the actual engine vibration, is less than the reference maximum target current value by the threshold value $\epsilon$, the target voltage V* is corrected to be decreased according to the positive difference $\Delta I$ and the drive frequency $f_{DV}$, which allows to reduce the electric power wastefully consumed by the booster circuit 120A and the driving circuits 121A, 121B vainly generating heat.

The active vibration isolating support device according to the second embodiment can flexibly respond to a case where the reference maximum target current value, which is the required current value $I_{Rq}$ assumed when setting the target voltage V* corresponding to the drive frequency $f_{DV}$ is less than the maximum value of the target current waveform for suppressing the actual engine vibration calculated in the driving current calculation unit 236B when the engine vibration characteristic is changed by changing a fuel used for the engine (e.g. from regular gasoline to premium) due to a user's reason or when the engine vibration characteristic is changed across the ages, whereby the responsiveness of the driving units 41, 41 can be kept to be the original target level.

In the second embodiment, the target voltage V* is corrected to be decreased when the positive difference $\Delta I$ is more than the threshold value $\epsilon$ set according to the drive frequency $f_{DV}$ however, an embodiment of the present invention is not limited to this, and when the positive difference $\Delta I$ is more than the threshold value $\epsilon$ set according to the drive frequency $f_{DV}$ the target voltage V* may be determined without correcting the target voltage V*.

Furthermore, in the second embodiment, the booster circuit controlling unit 237B includes the target voltage storing unit 237a, the reference maximum target current value data storing unit 237b and the target voltage value correction map 237c. The booster circuit controlling unit 237B firstly determines the target voltage V* according to the drive frequency $f_{DV}$, and secondly determines the target voltage V* by correcting the target voltage V* based on the difference $\Delta I$ between the reference maximum target current value according to the drive frequency $f_{DV}$ stored in the reference maximum target current value data storing unit 237b and the target current value I* input from the driving current calculation unit 236B. However, an embodiment of the present invention is not limited to this.

The target voltage storing unit 237a of the booster circuit controlling unit 237B may store a function or a map which obtains the target voltage V* by using the drive frequency $f_{DV}$ and the target current value I* as parameters. In this case, the reference maximum target current value data storing unit 237b and the target voltage value correction map 237c do not need to be provided.

In this case, the booster circuit controlling unit 237B can determine the target voltage V* based on the function or the map of the target voltage V* stored in the target voltage storing unit 237a with reference to the drive frequency $f_{DV}$ and the set target current value I*. For example, even if the magnitude of an actual engine vibration is greater than that in a corresponding vibration frequency range assumed when designing, the ACM_ECU 200B detects the maximum target current value I* of the target current waveform required to drive the actuator based on the estimated engine vibration state, and the higher target voltage V* is input to the booster circuit 120A. Thus, the responsiveness of the actuator including the solenoid in the active vibration isolating support device can be further enhanced. On the other hand, if the magnitude of the engine vibration is smaller than that assumed in a corresponding vibration frequency range when designing, the ACM_ECU 200B detects the maximum target current value I* of the target current waveform required to drive the actuator based on the estimated engine vibration state, and the lower target voltage V* is input to the booster circuit 120A. As a result, electric power wastefully consumed by the driving circuits 121A, 121B and the booster circuits 120A, 120B can be reduced.

Third Embodiment

Figure 10:
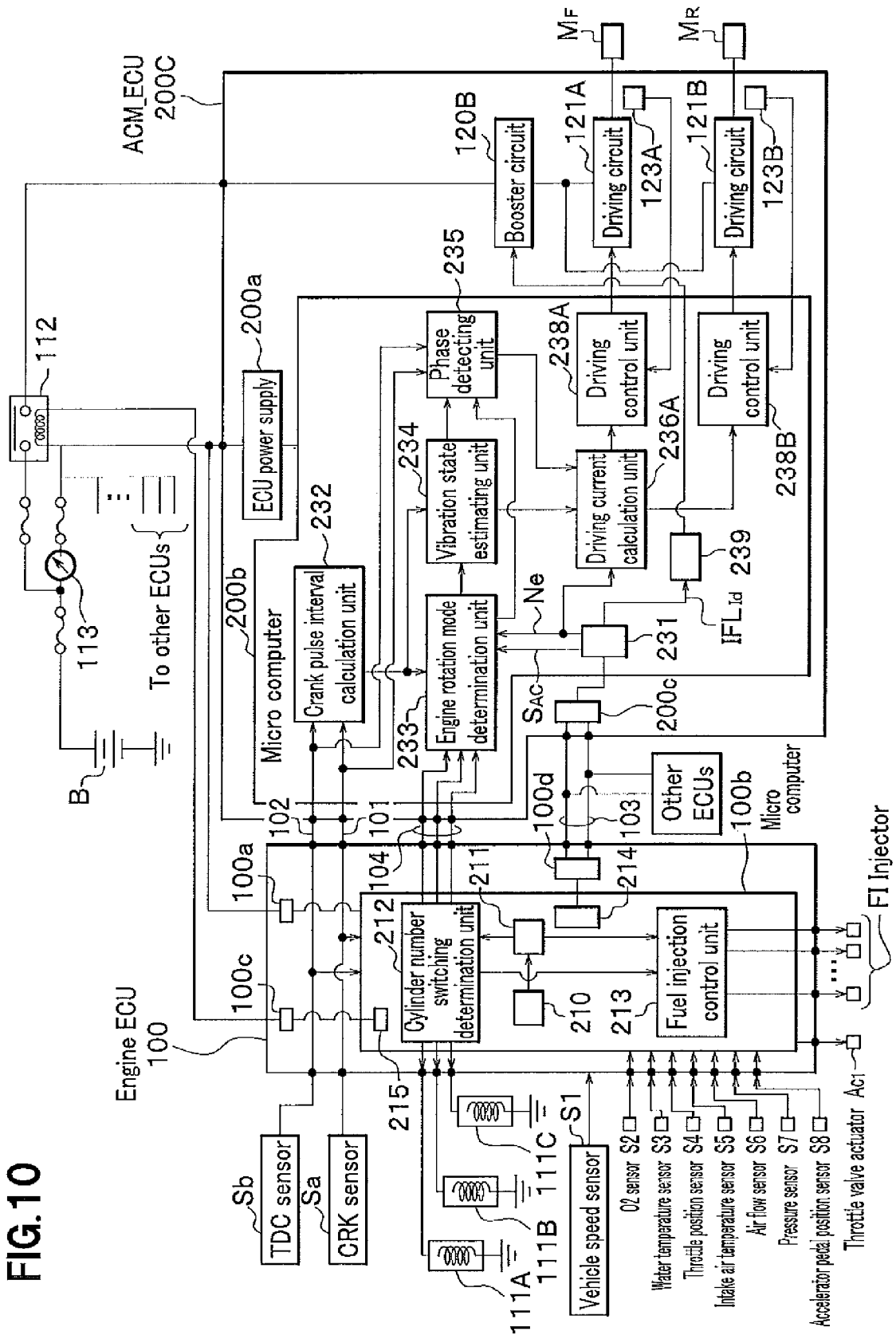
FIG. 10 is a functional block diagram which shows a configuration of an active vibration isolating support device according to a third embodiment.

Next, the third embodiment is described with reference to FIG. 10. FIG. 10 is a functional block diagram which shows a configuration of the active vibration isolating support device according to the third embodiment.

The configuration of the active vibration isolating support device according to the third embodiment is the same as that of the active vibration isolating support device of the first embodiment except that the ACM_ECU200C is provided instead of the ACM_ECU200A in the third embodiment.

More specifically, the ACM_ECU (control unit) 200C includes the ECU power supply circuit 200a (shown as the "ECU power supply 200a" in FIG. 10), the micro computer 200b, a ROM (not shown), an interface circuit for receiving signals from the engine ECU (engine control device) 100, various interface circuits such as the CAN communication unit 200c, the booster circuit 120B, the driving circuits 121A, 121B and the current sensors 123A, 123B. The ACM_ECU200C is arranged in a vehicle compartment, and heat emitted from the booster circuit 120A and the driving circuits 121A, 121B is treated by an air conditioner which controls a vehicle temperature.

Function of each functional block of the ACM_ECU200C is realized by the micro computer 200b executing programs stored in the ROM (not shown). More specifically, the ACM_ECU200C includes the CAN communication controlling unit 231, the crank pulse interval calculation unit 232, the engine rotation mode determination unit 233, the vibration state estimating unit 234, the phase detecting unit 235, the driving current calculation unit 236A, the driving control units 238A, 238B and the booster circuit controlling unit 239. In other words, the ACM_ECU200C additionally includes the booster circuit controlling unit 239 and omits the booster circuit controlling unit 237A, which is included in the ACM_ECU200A. The components corresponding to those of the first embodiment are assigned similar reference symbols and the description thereof will be omitted.

The CAN communication controlling unit 231 outputs a signal indicating the engine rotation speed Ne and the accelerator position signal $S_{AC}$ to the engine rotation mode determination unit 233, and also outputs an engine idling signal $IFL_{Id}$ to the booster circuit controlling unit 239.

The booster circuit controlling unit 239 sets a voltage-boosting permission signal to be transmitted to the booster circuit 120B to be OFF when the booster circuit controlling unit 239 receives the engine idling signal $IFL_{Id}$ from the CAN communication controlling unit 231. In contrast, the booster circuit controlling unit 239 sets the voltage-boosting permission signal to be output to the booster circuit 120B to be ON when the booster circuit controlling unit 239 does not receive the engine idling signal $IFL_{Id}$ from the CAN communication controlling unit 231.

The DC electricity supplied from the battery B (see FIG. 3) or the alternator is supplied to the booster circuit 120B when the ACM power switch 112 is ON. The booster circuit 120B is comprised, for example, of a step-up chopper circuit and includes, as commonly known, a reactor L, a switching element 253, a diode D, a condenser C, a current sensor, a circuit element such as a voltage sensor for detecting the voltage of the condenser, a voltage controlling unit, an electricity controlling unit and a PWM control unit (these components are not shown).

When the PWM controlling unit receives the voltage-boosting permission signal which is set to be ON from the booster circuit controlling unit 239, the PWM controlling unit increases a battery voltage to be a predetermined voltage, for example, 24V and is controlled by the voltage controlling unit and the electricity controlling unit to supply the DC electricity whose voltage is boosted to the driving circuits 121A, 121B so that the electric power of the sum of the AMC driving target current values output from the driving control units 238A, 238B can be supplied.

When the voltage-boosting permission signal which is set to be ON is not input to the PWM controlling unit from the booster circuit controlling unit 239 (OFF), the booster circuit 120B supplies the battery voltage to the driving circuits 121A, 121B without boosting the battery voltage.

Next, a control process performed by the booster circuit controlling unit 239 to permit the booster circuit 120B to boost the battery voltage or to prohibit the booster circuit 120B from boosting the battery voltage is described with reference to FIG. 11.

Figure 11:
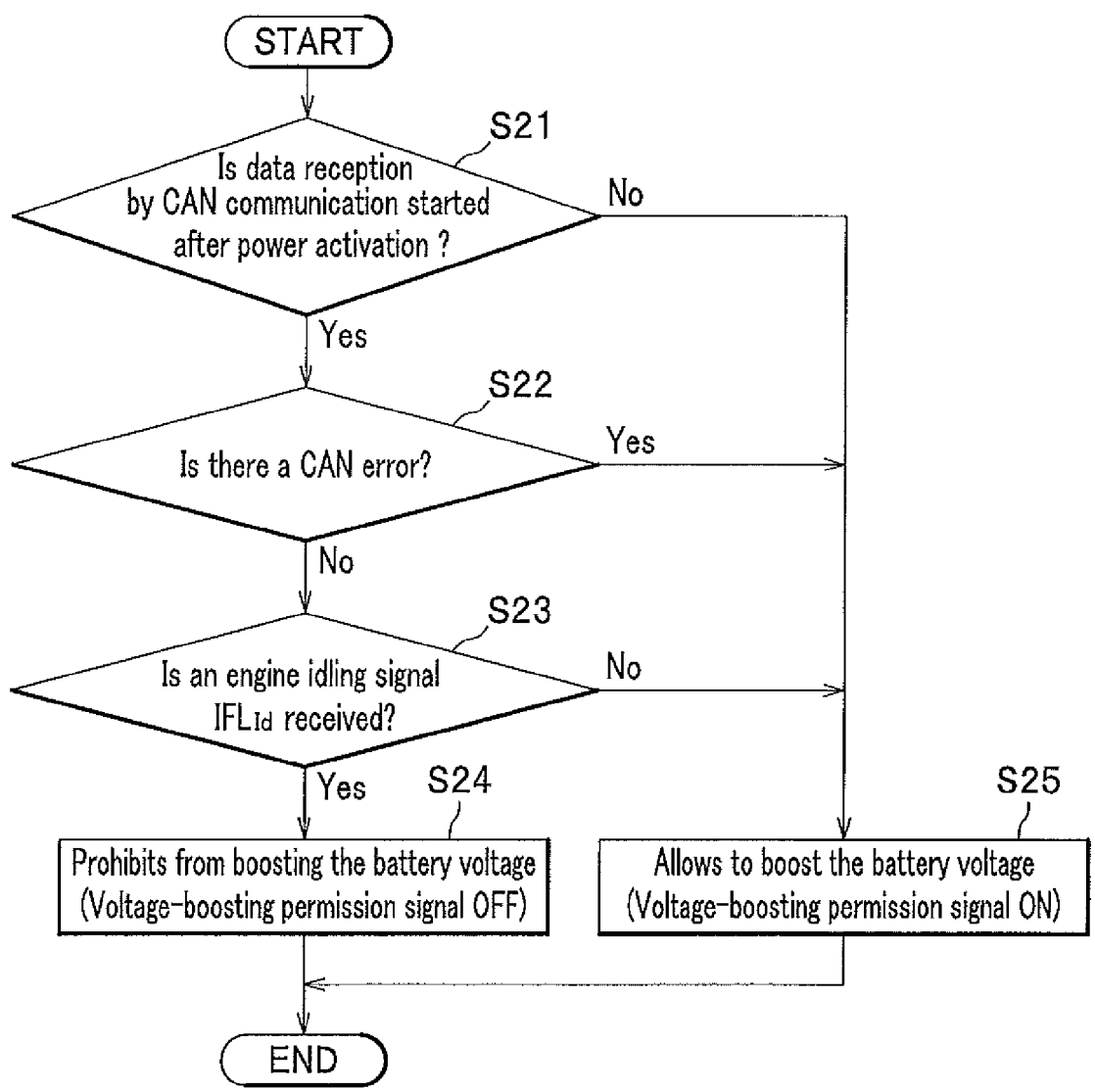
FIG. 11 is a flow chart showing the control process performed by the ACM_ECU to permit the booster circuit to boost the battery voltage or to prohibit the booster circuit from boosting the battery voltage.

FIG. 11 is a flow chart showing the control process performed by the ACM_ECU to permit the booster circuit to boost the battery voltage or to prohibit the booster circuit from boosting the battery voltage. As shown in FIG. 11, in step S21, the booster circuit controlling unit 239 checks whether or not the ACM_ECU200C starts to receive data from the engine ECU 100 through the CAN communication controlling unit 231 by the CAN communication after the IG-SW113 is operated and the power source is turned on. If the booster circuit controlling unit 239 determines that the data reception by the CAN communication is started after the power source is turned on (Yes), the processing proceeds to step S22. If the booster circuit controlling unit 239 determines that the data reception by the CAN communication is not started (No), the processing proceeds to step S25.

In step S22, the booster circuit controlling unit 239 determines via the CAN communication controlling unit 231 whether or not a CAN communication error flag is set (i.e. whether or not there is a CAN error). If there is not any CAN error (No), the processing proceeds to step S23. If there is a CAN error (Yes), the processing proceeds to step S25.

In step S23, the booster circuit controlling unit 239 determines whether or not the booster circuit controlling unit 239 receives the engine idling signal $IFL_{Id}$. If the booster circuit controlling unit 239 receives the engine idling signal $IFL_{Id}$ (Yes), the processing proceeds to step S24. If the booster circuit controlling unit 239 does not receive the engine idling signal $IFL_{Id}$ (No), the processing proceeds to step S25.

In step S24, it is prohibited to boost the battery voltage. In other words, the voltage-boosting permission signal to be output to the booster circuit 120B is set to be OFF. Then, a series of control processes is completed, and the control process is repeated from step S21.

In step S25, it is permitted to boost the battery voltage. In other words, the voltage-boosting permission signal to be output to the booster circuit 120B is set to be ON. Then, a series of control processes is completed, and the control process is repeated from step S21.

As described above, even if the ACM_ECU200 is configured to boost the battery voltage by the booster circuit 120B to be, for example, 24V and to supply the boosted voltage to the driving circuits 121A, 121B, the engine ECU 100 detects the idling driving state and sends the engine idling signal $IFL_{Id}$ to the ACM_ECU200C through the CAN communication line 103, and the booster circuit controlling unit 239 of the ACM_ECU200C sets the voltage-boosting permission signal which is output to the booster circuit 120B to be OFF when the booster circuit controlling unit 239 receives the engine idling signal $IFL_{Id}$ in the idling driving state where passengers may not be on a vehicle. In short, the booster circuit 120B supplies the electric power at the battery voltage to the driving circuits 121A, 121B without boosting the battery voltage to be 24V in the idling driving state.

As a result, the heat dissipation from the ACM_ECU200C, especially from the booster circuit 120B, the driving circuits 121A, 121B is reduced.

In the third embodiment, the vibration state estimating unit 234 does not need to obtain (calculate) the changing state of frequencies of the engine vibration when determining whether or not the engine vibration state is equal to or less than a predetermined frequency. For example, it is possible to easily determine that the engine is at the engine vibration frequency of the idling driving state by configuring in such a manner that the engine ECU 100 sends the engine idling signal $IFL_{Id}$ and the ACM_ECU200C receives the engine idling signal $IFL_{Id}$, whereby the control can be simplified.

The selective cylinder operation of the engine is performed only when a vehicle is running (i.e. when passengers are on the vehicle). On the other hand, an engine may be operated without any passengers and an air conditioner in a cabin may not be operated in the idling driving state. Therefore, it is necessary to make the temperature specification of the components of the ACM_ECU200C be high. The present invention allows to lower the temperature specification of the components of the ACM_ECU200C and thus to reduce the ACM_ECU200C in size and weight since in the present invention it is not necessary to wastefully boost the battery voltage to the target voltage $V_{max}$ as in the conventional technique when controlling to supply electric power.

Fourth Embodiment

Next, the fourth embodiment is described with reference to FIGS. 5 and 12.

Figure 12:
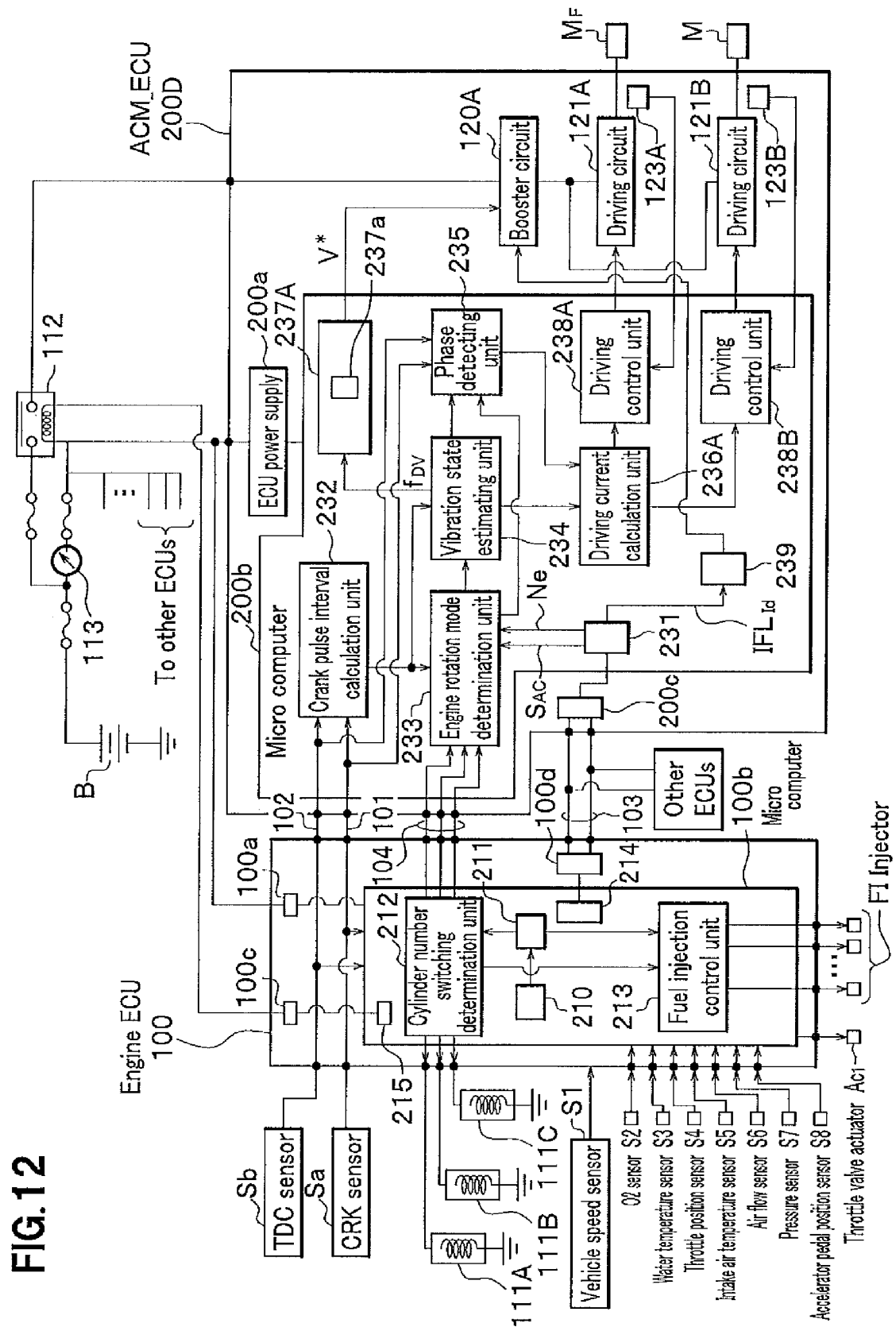
FIG. 12 is a functional block diagram showing a configuration of an active vibration isolating support device according to a fourth embodiment.

FIG. 12 is a functional block diagram showing a configuration of an active vibration isolating support device according to the fourth embodiment. The active vibration isolating support device according to the fourth embodiment is a combination of the first embodiment and the third embodiment. A configuration of the active vibration isolating support device in the fourth embodiment is the same as that of the active vibration isolating support device in the first embodiment except that the ACM_ECU200D is provided in the fourth embodiment instead of the ACM_ECU200A.

More specifically, the ACM_ECU (control unit) 200D includes the ECU power supply circuit 200a (referred to as "ECU power supply 200a" in FIG. 12), the micro computer 200b, a ROM (not shown), the interface circuit for receiving signals from the engine ECU (engine control device)100, various interface circuits such as the CAN communication unit 200c, the booster circuit 120A, the driving circuits 121A, 121B and the current sensors 123A, 123B.

The ACM_ECU200D is arranged in a vehicle compartment, and heat emitted from the booster circuit 120A and the driving circuits 121A, 121B is treated by an air conditioner which controls a vehicle temperature.

Function of each functional block of the ACM_ECU200D is realized by the micro computer 200b executing programs stored in the ROM (not shown). More specifically, the ACM_ECU200D includes the CAN communication controlling unit 231, the crank pulse interval calculation unit 232, the engine rotation mode determination unit 233, the vibration state estimating unit 234, the phase detecting unit 235, the driving current calculation unit 236A, the driving control units 238A, 238B, the booster circuit controlling unit (which may also be referred to as a target voltage determining unit) 237A and the booster circuit controlling unit 239. In short, the ACM_ECU200D is configured by adding the booster circuit controlling unit 239 to the ACM_ECU 200A of the first embodiment. Components of the fourth embodiment corresponding to those of the first embodiment are assigned similar reference numerals, and the description thereof will be omitted.

The CAN communication controlling unit 231 outputs a signal indicating the engine rotation speed Ne or the accelerator position signal $S_{AC}$ to the engine rotation mode determination unit 233 and also outputs the engine idling signal $IFL_{Id}$ to the booster circuit controlling unit 239.

The booster circuit controlling unit 239 sets the voltage-boosting permission signal to be output to the booster circuit 120A to be OFF when the booster circuit controlling unit 239 receives the engine idling signal $IFL_{Id}$ from the CAN communication controlling unit 231. The booster circuit controlling unit 239 sets the voltage-boosting permission signal to be output to the booster circuit 120A to be ON when the booster circuit controlling unit 239 does not receive the engine idling signal $IFL_{Id}$ from the CAN communication controlling unit 231.

The DC electricity from the battery B (see FIG. 3) or the alternator is supplied to the booster circuit 120A when the ACM power switch 112 is ON.

Similarly to the first embodiment, the PWM controlling unit 250c (see FIG. 5) of the booster circuit 120A generates a duty signal based on the duty ratio input from the current control unit 250b when the voltage-boosting permission signal which is set to be ON is input to the PWM controlling unit 250c from the booster circuit controlling unit 239 (shown in a dashed line), and outputs the duty signal to the gate driving circuit 251. In other words, the PWM controlling unit 250c is controlled by the voltage controlling unit 250a and the current control unit 250b to boost the battery voltage to the target voltage V* which is input to the voltage controlling unit 250a from the booster circuit controlling unit 237A. The PWM controlling unit 250c then supplies a DC electricity of which voltage is boosted to the driving circuits 121A, 121B so that the driving circuits 121A, 121B can supply the sum of the AMC driving target current values input from the driving control units 238A, 238B. When the voltage-boosting permission signal which is set to be ON is not input to the PWM controlling unit 250c from the booster circuit controlling unit 239(OFF), the booster circuit 120A supplies the battery voltage to the driving circuit 121A, 121B without boosting the battery voltage.

As described above, it is possible to reduce the electric power which is consumed by the booster circuit 120A or the driving circuits 121A, 121B wastefully generating heat in a low drive frequency $f_{DV}$ range in the combination of the first embodiment and the third embodiment. The heat emitted from the ACM_ECU200D, especially from the booster circuit 120A or the driving circuits 121A, 121B is reduced.

Furthermore, in the idling driving state of the engine, the booster circuit 120A is controlled to supply electricity at the battery voltage or a voltage generated by the alternator, and thus, the temperature of the booster circuit 120A or the driving circuits 121A, 121B becomes lower than that of the booster circuit or the driving circuits in a conventional technique.

The selective cylinder operation of the engine is performed only when a vehicle is running (i.e. when passengers are on the vehicle). On the other hand, an engine may be operated without any passengers and an air conditioner in a cabin may not be operated in the idling driving state. Therefore, it is necessary to make the temperature specification of the components of the ACM_ECU200D be high. The present invention allows to lower the temperature specification of the components of the ACM_ECU200D and thus to reduce the ACM_ECU200D in size and weight since in the present invention it is not necessary to wastefully boost the battery voltage to the target voltage $V_{max}$ as in the conventional technique when controlling to supply electric power.

Fifth Embodiment

Figure 13:
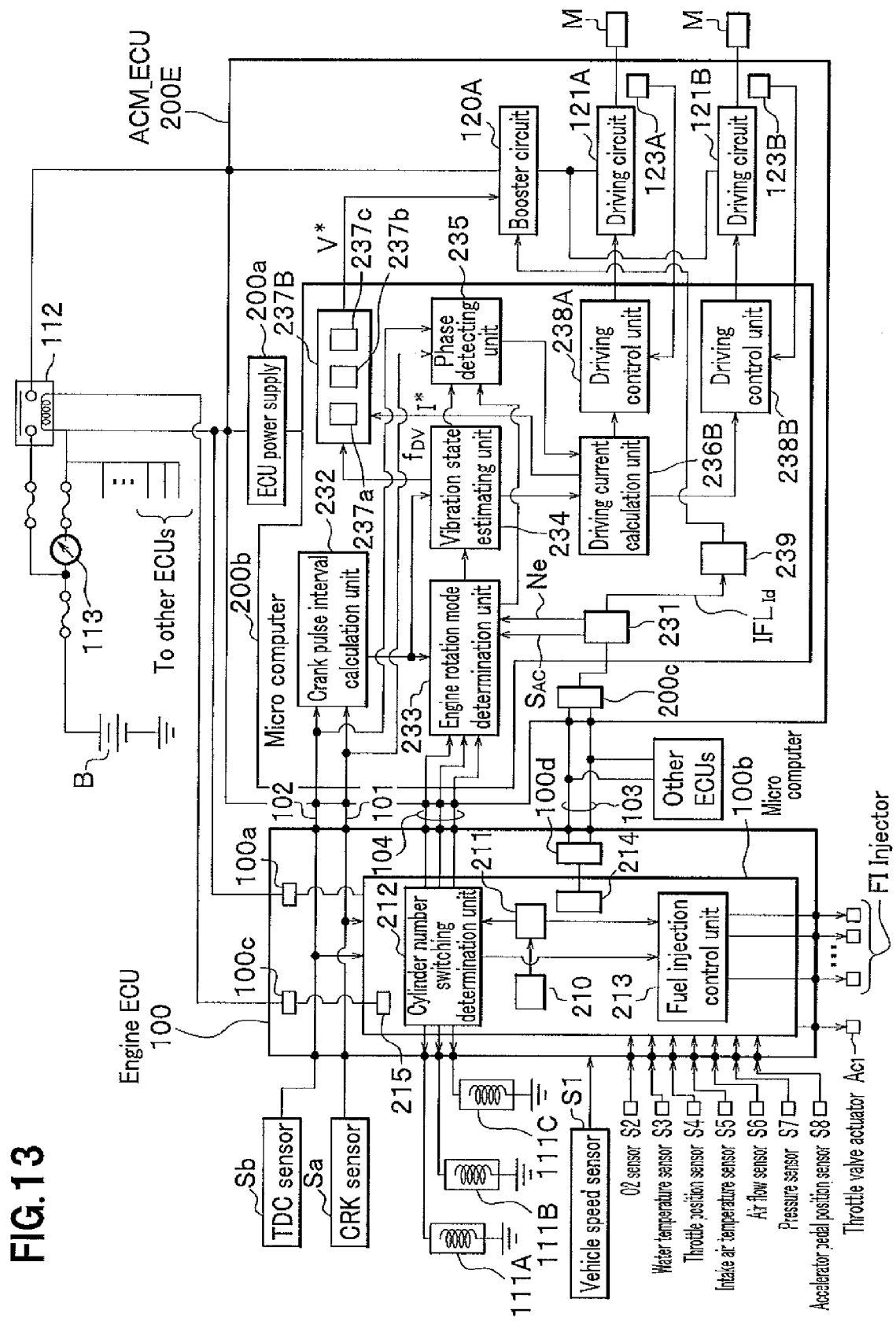
FIG. 13 is a functional block diagram showing a configuration of an active vibration isolating support device according to a fifth embodiment.

Next, a fifth embodiment is described with reference to FIGS. 5 and 13. FIG. 13 is a functional block diagram showing a configuration of the active vibration isolating support device according to the fifth embodiment. The active vibration isolating support device according to the fifth embodiment is a combination of the second embodiment and the third embodiment. A configuration of the active vibration isolating support device according to the fifth embodiment is the same as that of the active vibration isolating support device according to the second embodiment except that the active vibration isolating support device of the fifth embodiment includes an ACM_ECU200E instead of the ACM_ECU200B.

More specifically, the ACM_ECU (control unit) 200E includes the ECU power supply circuit 200a (referred to as "ECU power supply 200a" in FIG. 13), the micro computer 200b, the ROM (not shown), an interface circuit for receiving signals from the engine ECU (engine control device) 100, various interface circuits such as the CAN communication unit 200c, the booster circuit 120A, the driving circuits 121A, 121B and the current sensors 123A, 123B. The ACM_ECU200D is arranged in a vehicle compartment, and heat emitted from the booster circuit 120A and the driving circuits 121A, 121B is treated by an air conditioner which controls a vehicle temperature.

Function of each functional block of the ACM_ECU200E is realized by the micro computer 200b executing programs stored in the ROM (not shown). More specifically, the ACM_ECU200E includes the CAN communication controlling unit 231, the crank pulse interval calculation unit 232, the engine rotation mode determination unit 233, the vibration state estimating unit 234, the phase detecting unit 235, the driving current calculation unit (which may also be referred to as "a target current waveform setting unit", or "a target current waveform maximum value detection unit") 236B, the driving control units 238A, 238B, the booster circuit controlling unit (which may also be referred to as the target voltage determining unit, the difference calculation unit, the target voltage correction unit) 237B and the booster circuit controlling unit 239. In short, the ACM_ECU200E is configured by adding the booster circuit controlling unit 239 to the second embodiment. Components corresponding to those of the second embodiment are assigned similar reference numerals, and the description thereof will be omitted.

The CAN communication controlling unit 231 outputs a signal indicating the engine rotation speed Ne and the accelerator position signal $S_{AC}$ to the engine rotation mode determination unit 233, and also outputs the engine idling signal $IFL_{Id}$ to the booster circuit controlling unit 239.

When the booster circuit controlling unit 239 receives the engine idling signal $IFL_{Id}$ from the CAN communication controlling unit 231, the booster circuit controlling unit 239 sets the voltage-boosting permission signal to be output to the booster circuit 120A to be OFF. In contrast, when the booster circuit controlling unit 239 does not receive the engine idling signal $IFL_{Id}$ from the CAN communication controlling unit 231, the booster circuit controlling unit 239 sets the voltage-boosting permission signal to be output to the booster circuit 120A to be ON.

The DC electricity from the battery B or the alternator is supplied to the booster circuit 120A when the ACM power switch 112 is ON. Similarly to the second embodiment, the PWM controlling unit 250c (see FIG. 5) of the booster circuit 120A generates a duty signal based on the duty ratio input from the current control unit 250b when the voltage-boosting permission signal which is set to be ON is input to the PWM controlling unit 250c from the booster circuit controlling unit 239 (shown in a dashed line), and outputs the duty signal to the gate driving circuit 251. In other words, the PWM controlling unit 250c is controlled by the voltage controlling unit 250a and the current control unit 250b to boost the battery voltage to the target voltage value V* which is input to the voltage controlling unit 250a from the booster circuit controlling unit 237B. The PWM controlling unit 250c then supplies a DC electricity of which voltage is boosted to the driving circuits 121A, 121B so that the driving circuits 121A, 121B can supply the sum of the AMC driving target current values input from the driving control units 238A, 238B.

As described above, it is possible to reduce the electric power which is consumed by the booster circuit 120A or the driving circuits 121A, 121B wastefully generating heat in a low drive frequency $f_{DV}$ range in the combination of the second embodiment and the third embodiment.

Furthermore, in the idling driving state of the engine, the booster circuit 120A is controlled to supply electricity at the battery voltage or a voltage generated by the alternator, and thus, the temperature of the booster circuit 120A or the driving circuits 121A, 121B becomes lower than that of the booster circuit or the driving circuits in a conventional technique.

The selective cylinder operation of the engine is performed only when a vehicle is running (i.e. when passengers are on the vehicle). On the other hand, an engine may be operated without any passengers and an air conditioner in a cabin may not be operated in the idling driving state. Therefore, it is necessary to make the temperature specification of the components of the ACM_ECU200E be high. The present invention allows to lower the temperature specification of the components of the ACM_ECU200E and thus to reduce the ACM_ECU200E in size and weight since in the present invention it is not necessary to wastefully boost the battery voltage to the target voltage $V_{max}$ as in the conventional technique when controlling to supply electric power.

In accordance with the present invention, a solenoid driving device with excellent electric power efficiency which controls an actuator by using a solenoid, and an active vibration isolating support device with excellent electric power efficiency including the solenoid driving device can be provided. An active vibration isolating support device which solves the heat radiation problem at the time of an idling driving state of an ACM controlling ECU which boosts the battery voltage and supplies an electric power to an actuator can also be provided.

Modification of the Third to Fifth Embodiments

In the third to fifth embodiment, the engine ECU 100 transmits the engine idling signal $IFL_{Id}$ to the ACM_ECUs 200C, 200D, 200E through the CAN communication line 103, and the ACM_ECUs 200C, 200D, 200E receive the engine idling signal $IFL_{Id}$ by the CAN communication controlling unit 231 and determines whether or not the ACM_ECUs 200C, 200D, 200E receive the engine idling signal $IFL_{Id}$ by the booster circuit controlling unit 239 and sets the voltage-boosting permission signal to be ON or OFF which is to be transmitted to the booster circuit 120B or the booster circuit 120A. However, an embodiment of the present invention is not limited to this, and modifications of the third to fifth embodiments are described below.

First Modification

In a first modification of the third to fifth embodiments, the vibration state estimating unit 234 may determines whether or not the engine vibration frequency is equal to or less than a predetermined frequency (i.e. determining whether or not the engine vibration frequency is that of the idling driving state) based on an obtained engine vibration cycle, and may set the voltage-boosting permission signal to be OFF which is to be output to the booster circuit 120B or the booster circuit 120A via the booster circuit controlling unit 239 when the engine vibration frequency is equal to or less than the predetermined frequency.

Second Modification

In a second modification of the third to fifth embodiment, the CAN communication controlling unit 231 receives the accelerator position signal $S_{AC}$ which indicates the step-in amount of the accelerator pedal and a signal indicating the engine rotation speed Ne from the engine control ECU 100 and outputs the signals to the engine rotation mode determination unit 233. The engine rotation mode determination unit 233 determines whether or not the accelerator is stepped in based on the position signal $S_{AC}$ to determine the engine is at the idling driving state, and then the engine idling signal $IFL_{Id}$ is output to the booster circuit controlling unit 239.

Third Modification

Further, in a third modification of the third to fifth embodiments, the CAN communication controlling unit 231 receives a signal indicating the engine rotation speed Ne from the engine control ECU 100, and outputs the signal to the engine rotation mode determination unit 233. The engine rotation mode determination unit 233 determines that the engine is in the idling driving state and outputs the engine idling signal IFL$_{Id}$ to the booster circuit controlling unit 239 when the engine rotation speed Ne is in a predetermined idling range of the engine rotation speed.

INDUSTRIAL APPLICABILITY

In the embodiments and the modifications of the embodiments, the solenoid driving device according to the invention is described in a case where the solenoid driving device according to the invention is applied to the active vibration isolating support device, however, the application of the present invention is not limited to this. The present invention can be generally applied to any solenoid driving device which extends or contracts an actuator by controlling the solenoid, and allows the efficient use of the electric power for driving an actuator in any solenoid driving device.

The embodiment according to the present invention has been explained as aforementioned. However, the embodiment of the present invention is not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A solenoid driving device comprising:
    a booster circuit which boosts a source voltage when supplying electric power;
    a driving circuit which drives and controls an actuator including a solenoid by supplying the actuator with the electric power which is boosted and supplied by the booster circuit;
    a drive frequency determining unit which determines a drive frequency at which the actuator is driven based on drive request information for driving the actuator;
    a target voltage determining unit which determines on the basis of the determined drive frequency a target voltage value to which the source voltage is boosted and at which the electric power is supplied to the solenoid; wherein
    the determined target voltage value is input to the booster circuit, and the booster circuit supplies the driving circuit with the electric power required to drive the solenoid at the target voltage value.

2. The solenoid driving device according to claim 1, further comprising:
    a target boosted voltage storing unit which stores in advance the target voltage value to which the source voltage is boosted when supplying the electric power to the solenoid and which is associated with the drive frequency at which the actuator is driven, and
    the target voltage determining unit which refers to the determined drive frequency to obtain the target voltage value which is associated with the determined drive frequency and is stored in the target boosted voltage storing unit.

3. An active vibration isolating support device which uses the solenoid driving device according to claim 2 to support an engine in a vehicle body and comprises a control unit which estimates a vibration state of the engine based on a signal output from a sensor which detects a rotational fluctuation of the engine and drives to expand or contract the actuator with the solenoid to suppress transmission of vibration, the control unit including:
    the booster circuit which boosts a battery voltage which is the source voltage;
    the driving circuit which drives and controls the actuator by supplying the actuator including the solenoid with the electric power boosted and supplied by the booster circuit;
    an engine vibration state estimating unit which estimates the vibration state of the engine;
    the drive frequency determining unit which determines the drive frequency at which the actuator is driven on the basis of the estimated vibration state of the engine which is the drive request information;
    a target current waveform setting unit which sets a target current waveform at which the actuator is driven based on the estimated vibration state of the engine;
    a target current waveform maximum value detection unit which detects the maximum target current value of the set target current waveform;
    the target boosted voltage storing unit which stores, as a function or a map of the target voltage value, a voltage required to be supplied to the solenoid, the function or the map using the drive frequency at which the actuator is driven and the maximum target current value of the target current waveform as parameters;
    the target voltage determining unit which refers to the set determined drive frequency and the detected maximum target current value of the target current waveform to determine the target voltage value based on the function of the map of the target voltage value stored in the target boosted voltage storing unit, wherein
    the determined target voltage value is input to the booster circuit, and the booster circuit supplies the driving circuit with the electric power required to drive the solenoid.

4. An active vibration isolating support device which uses the solenoid driving device according to claim 2 to support an engine in a vehicle body and comprises a control unit which estimates a vibration state of the engine based on a signal output from a sensor which detects a rotational fluctuation of the engine and drives to expand or contract the actuator with the solenoid to suppress transmission of vibration, the control unit including:
    a booster circuit control unit which outputs a boost stop signal to the booster circuit, wherein
    when the control unit determines that the estimated vibration state of the engine is equal to or less than a predetermined frequency, the control unit causes the booster circuit control unit to output the boost stop signal to stop the boosting circuit from boosting a battery voltage which is a power supply voltage and controls the booster circuit to supply the battery voltage without boosting the battery voltage.

5. An active vibration isolating support device which uses the solenoid driving device according to claim 1 to support an engine in a vehicle body and comprises a control unit which estimates a vibration state of the engine based on a signal output from a sensor which detects a rotational fluctuation of the engine and drives to expand or contract the actuator including the solenoid to suppress transmission of vibration, the control unit including:
    an engine vibration state estimating unit which estimates the vibration state of the engine;
    the drive frequency determining unit; and
    the target voltage determining unit, wherein the drive frequency determining unit determines the drive frequency at which the actuator is driven based on the vibration state of the engine which is the drive request information.

6. The active vibration isolating support device according to claim 5 to support the engine in the vehicle body and comprises the control unit which estimates the vibration state of the engine based on the signal output from the sensor which detects the rotational fluctuation of the engine and drives to expand or contract the actuator including the solenoid to suppress the transmission of vibration, the control unit including:

the drive frequency determining unit which determines the drive frequency at which the actuator is driven based on the estimated vibration state of the engine which is the drive request information;

a target boosted voltage storing unit which stores, as the target voltage value, a voltage required to be supplied to the solenoid in association with the drive frequency at which the actuator is driven and stores a reference maximum target current value which is assumed when setting the target voltage value;

the target voltage determining unit which refers to the determined drive frequency to obtain and determine the target voltage value and the reference maximum target current value stored in the target boosted voltage storing unit;

a target current waveform setting unit which sets a target current waveform which is required to drive the actuator based on the estimated vibration state of the engine;

a target current waveform maximum value detection unit which detects the maximum target current value of the set target current waveform;

a difference calculation unit which calculates the difference between the detected maximum target current value and the obtained reference maximum target current value; and a target voltage correction unit which corrects the target voltage value which has been determined by the target voltage determining unit in accordance with the calculated difference if the detected maximum target current value is equal to or greater than the reference maximum target current value at least by a predetermined value, wherein the target voltage value which has been corrected by the target voltage correction unit is input to the booster circuit as necessary.

7. A solenoid driving device comprising:
a booster circuit which boosts a source voltage when supplying electric power;
a driving circuit which drives and controls an actuator including a solenoid by supplying the actuator with the electric power which is boosted and supplied by the booster circuit;
a drive frequency determining unit which determines a drive frequency at which the actuator is driven based on drive request information for driving the actuator;
a target voltage determining unit which determines on the basis of the determined drive frequency a target voltage value to which the source voltage is boosted and at which the electric power is supplied to the solenoid; wherein
the determined target voltage value is input to the booster circuit, and the booster circuit supplies the driving circuit with the electric power required to drive the solenoid at the target voltage value; and
the target voltage value varies according to the determined drive frequency.

8. A solenoid driving device according to claim 7, wherein the target voltage value is greater than a predetermined minimum voltage and is less than or equal to a predetermined maximum voltage.

9. A solenoid driving device comprising:
a booster circuit which boosts a source voltage when supplying electric power;
a driving circuit which drives and controls an actuator including a solenoid by supplying the actuator with the electric power which is boosted and supplied by the booster circuit;
a drive frequency determining unit which determines a drive frequency at which the actuator is driven based on drive request information for driving the actuator;
a target voltage determining unit which determines on the basis of the determined drive frequency a target voltage value to which the source voltage is boosted and at which the electric power is supplied to the solenoid in such a manner that the target voltage value becomes low at least in a part of a range of the drive frequency used where the drive frequency is low, wherein the target voltage is associated with the drive frequency; wherein
the determined target voltage value is input to the booster circuit, and the booster circuit supplies the driving circuit with the electric power required to drive the solenoid at the target voltage value.

* * * * *